(12) United States Patent
Ugajin

(10) Patent No.: US 11,336,386 B2
(45) Date of Patent: May 17, 2022

(54) SUBMARINE BRANCHING APPARATUS, OPTICAL SUBMARINE CABLE SYSTEM, AND OPTICAL COMMUNICATION METHOD

(71) Applicant: NEC Corporation, Tokyo (JP)

(72) Inventor: Kazusa Ugajin, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/637,542

(22) PCT Filed: Sep. 19, 2018

(86) PCT No.: PCT/JP2018/034549
§ 371 (c)(1),
(2) Date: Feb. 7, 2020

(87) PCT Pub. No.: WO2019/065383
PCT Pub. Date: Apr. 4, 2019

(65) Prior Publication Data
US 2020/0259584 A1 Aug. 13, 2020

(30) Foreign Application Priority Data
Sep. 28, 2017 (JP) .............................. JP2017-188684

(51) Int. Cl.
*H04J 14/02* (2006.01)
*H04B 10/85* (2013.01)
(Continued)

(52) U.S. Cl.
CPC ........ *H04J 14/0204* (2013.01); *H04B 10/038* (2013.01); *H04B 10/077* (2013.01);
(Continued)

(58) Field of Classification Search
CPC ....... H04J 14/0201–022; H04J 14/0206; H04J 14/0204; H04J 14/0205; H04J 14/021;
(Continued)

(56) References Cited

U.S. PATENT DOCUMENTS 6,307,986 B1 * 10/2001 Duerksen ............ H04J 14/0212
385/24
2003/0161635 A1 * 8/2003 Milton ................ H04J 14/0206
398/79

(Continued)

FOREIGN PATENT DOCUMENTS

CN       103493413 A     1/2014
CN       104429001 A     3/2015
(Continued)

OTHER PUBLICATIONS

International Search Report corresponding to PCT/JP2018/034549 dated Nov. 27, 2018 (2 pages).

(Continued)

*Primary Examiner* — Casey L Kretzer

(57) ABSTRACT

In order to provide a submarine optical transmission system that utilizes multiple wavelength bands, the submarine branching apparatus is provided with: a first demultiplexing part for demultiplexing a wavelength-multiplex optical signal input from a first terminal station into a first wavelength-multiplex optical signal and a second wavelength-multiplex optical signal; an optical add-drop part for outputting at least a third wavelength-multiplex optical signal included in the first wavelength-multiplex optical signal to a second terminal station, and for outputting a fifth wavelength-multiplex optical signal by multiplexing at least a fourth wavelength-multiplex optical signal included in the first wavelength-multiplex optical signal with a wavelength-multiplex optical signal input from the second terminal station; and a first multiplex part for multiplex the second wavelength-multi- (Continued)

plex optical signal with the fifth wavelength-multiplex optical signal input from the optical add-drop part and outputting the resulting signal to a third terminal station.

21 Claims, 25 Drawing Sheets

(51) Int. Cl.
  *H04B 10/80* (2013.01)
  *H04B 10/038* (2013.01)
  *H04B 10/077* (2013.01)

(52) U.S. Cl.
  CPC ............ *H04B 10/80* (2013.01); *H04B 10/85* (2013.01); *H04J 14/021* (2013.01); *H04J 14/0205* (2013.01); *H04J 14/0206* (2013.01); *H04J 14/0213* (2013.01)

(58) Field of Classification Search
  CPC ......... H04J 14/0213; H04B 10/03–038; H04B 10/077; H04B 10/80; H04B 10/85
  See application file for complete search history.

(56) References Cited

U.S. PATENT DOCUMENTS

| | | | |
|---|---|---|---|
| 2005/0281557 A1 | 12/2005 | Fishman et al. | |
| 2011/0135310 A1 | 6/2011 | Kovsh et al. | |
| 2012/0243879 A1* | 9/2012 | Nashimoto | H04B 10/293 398/140 |
| 2013/0071104 A1* | 3/2013 | Nakashima | H04J 14/0283 398/3 |
| 2015/0200742 A1* | 7/2015 | Kamalov | H04J 14/0201 398/85 |
| 2016/0308638 A1 | 10/2016 | Zhang | |
| 2017/0019205 A1 | 1/2017 | Inoue | |
| 2017/0299814 A1 | 10/2017 | Mikami | |
| 2018/0054271 A1 | 2/2018 | Abe | |
| 2018/0278326 A1* | 9/2018 | Frisch | H04B 10/038 |

FOREIGN PATENT DOCUMENTS

| | | |
|---|---|---|
| CN | 106134109 A | 11/2016 |
| EP | 1608097 A2 | 12/2005 |
| EP | 1628424 A2 | 2/2006 |
| EP | 3076574 A1 | 10/2016 |
| EP | 3089382 A1 | 11/2016 |
| EP | 3116144 A1 | 1/2017 |
| EP | 3203660 A1 | 8/2017 |
| EP | 3273625 A1 | 1/2018 |
| JP | 2004-166306 A | 6/2004 |
| JP | 2006-5938 A | 1/2006 |
| JP | 2010-283446 A | 12/2010 |
| JP | 2012-205045 A | 10/2012 |
| JP | 2017-509183 A | 3/2017 |
| WO | WO-2012/132688 A1 | 10/2012 |
| WO | WO-2015/133106 A1 | 9/2015 |
| WO | WO-2016/017181 A1 | 2/2016 |
| WO | WO-2016/051774 A1 | 4/2016 |
| WO | WO-2016/147610 A1 | 9/2016 |
| WO | WO-2017093751 A * | 6/2017 ........... G02B 6/3562 |

OTHER PUBLICATIONS

Written Opinion corresponding to PCT/JP2018/034549 dated Nov. 27, 2018 (22 pages).
Extended European Search Report issued in European Patent Application No. 18861174.3, dated Nov. 3, 2020, 13 pages.
Chinese Office Action for CN Application No. 201880058673.9 dated Mar. 1, 2021 with English Translation.

* cited by examiner

SUBMARINE BRANCHING APPARATUS, OPTICAL SUBMARINE CABLE SYSTEM, AND OPTICAL COMMUNICATION METHOD

CROSS REFERENCE TO RELATED APPLICATIONS

This application is a national stage application of International Application No. PCT/JP2018/034549 entitled "Submarine Branching Apparatus, Optical Submarine Cable System, and Optical Communication Method" filed on Sep. 19, 2018, the disclosures of which are hereby incorporated by reference in their entirety.

TECHNICAL FIELD

The present invention relates to a submarine branching apparatus in an optical submarine cable system.

BACKGROUND ART

A wavelength division multiplexing (WDM) system multiplexing and transmitting optical signals at various wavelengths for achieving large-capacity communication is used in a trunk long-distance optical communication system.

Transmission of signals is controlled on a per-wavelength basis in a WDM-based optical communication system. PTLs 1 and 2 describe examples of an optical add/drop multiplexer (OADM) device and a reconfigurable optical add/drop multiplexer (ROADM) device provided in WDM-based optical communication systems. An OADM device and a ROADM device perform add/drop of signals on a per-wavelength basis. Thus, transmission of signals can be controlled on a per-wavelength basis.

In recent years, OADM devices and ROADM devices have started to be applied to optical submarine cable systems, and flexible network control has been demanded also in optical submarine cable systems. PTL 3 describes an example of an optical submarine cable system including a submarine branching apparatus having an OADM function. A submarine branching apparatus is laid on the seabed and is provided on an optical submarine cable coupling terrestrial terminal stations. A submarine branching apparatus performs add/drop of a signal on a wavelength-multiplexed optical signal (WDM signal) input from a terrestrial terminal station on a per-wavelength basis and outputs a WDM signal to each terrestrial terminal station. PTL 4 describes an optical transmission system including a four-wave mixer.

CITATION LIST

Patent Literature

PTL 1: International Publication No. 2016/017181
PTL 2: Japanese Laid-Open Patent Application Publication No. 2010-283446
PTL 3: International Publication No. 2012/132688
PTL 4: Japanese Laid-Open Patent Application Publication No. 2004-166306

SUMMARY OF INVENTION

Technical Problem

With recent increase in communication traffic, for example, an optical transmission system using a plurality of wavelength bands, such as both of a wavelength band in a conventional band (C-band: 1550 nm band) and a wavelength band in a long wavelength band (L-band: 1580 nm band), is under study in an optical submarine cable system, in order to achieve larger-capacity communication.

In order to provide an optical submarine cable system using a plurality of wavelength bands, a submarine branching apparatus applicable to any WDM signal in the plurality of wavelength bands is required.

Then, an object of the present invention is to provide a submarine branching apparatus, a submarine optical communication system, and an optical communication method that are applicable to WDM signals in a plurality of wavelength bands.

Solution to Problem

A submarine branching apparatus according to the present invention includes: a first demultiplexing unit for demultiplexing a wavelength-multiplexed optical signal input from a first terminal station into a first wavelength-multiplexed optical signal and a second wavelength-multiplexed optical signal; an optical add/drop unit for outputting at least a third wavelength-multiplexed optical signal included in the first wavelength-multiplexed optical signal to a second terminal station and outputting a fifth wavelength-multiplexed optical signal acquired by multiplexing at least a fourth wavelength-multiplexed optical signal included in the first wavelength-multiplexed optical signal and a wavelength-multiplexed optical signal input from the second terminal station; and a first multiplexing unit for multiplexing the second wavelength-multiplexed optical signal and a fifth wavelength-multiplexed optical signal input from the optical add/drop unit, and outputting the multiplexed signal to a third terminal station.

An optical submarine cable system according to the present invention includes: a first terminal station, a second terminal station, and a third terminal station each of which is capable of outputting a wavelength-multiplexed optical signal; and a submarine branching apparatus coupled with the first terminal station, the second terminal station, and the third terminal station through an optical submarine cable, wherein the submarine branching apparatus includes: a first demultiplexing unit for demultiplexing a wavelength-multiplexed optical signal input from the first terminal station into a first wavelength-multiplexed optical signal and a second wavelength-multiplexed optical signal; an optical add/drop unit for outputting at least a third wavelength-multiplexed optical signal included in the first wavelength-multiplexed optical signal to the second terminal station and outputting a fifth wavelength-multiplexed optical signal acquired by multiplexing at least a fourth wavelength-multiplexed optical signal included in the first wavelength-multiplexed optical signal and a wavelength-multiplexed optical signal input from the second terminal station; and a first multiplexing unit for multiplexing the second wavelength-multiplexed optical signal and a fifth wavelength-multiplexed optical signal input from the optical add/drop unit, and outputting the multiplexed signal to the third terminal station.

An optical communication method according to the present invention includes: demultiplexing a wavelength-multiplexed optical signal input from a first terminal station into a first wavelength-multiplexed optical signal and a second wavelength-multiplexed optical signal; outputting at least a third wavelength-multiplexed optical signal included in the first wavelength-multiplexed optical signal to a second terminal station and outputting a fifth wavelength-multiplexed optical signal acquired by multiplexing at least a fourth wavelength-multiplexed optical signal included in the first wavelength-multiplexed optical signal and a wavelength-multiplexed optical signal input from a second terminal station; and multiplexing the second wavelength-multiplexed optical signal and the fifth wavelength-multiplexed optical signal, and outputting the multiplexed signal to a third terminal station.

Advantageous Effects of Invention

The present invention can provide a submarine branching apparatus, an optical submarine cable system, and an optical communication method that are applicable to WDM signals in a plurality of wavelength bands.

EXAMPLE EMBODIMENT

Next, example embodiments of the present invention will be described in detail with reference to drawings.

First Example Embodiment

Configuration

Figure 1:
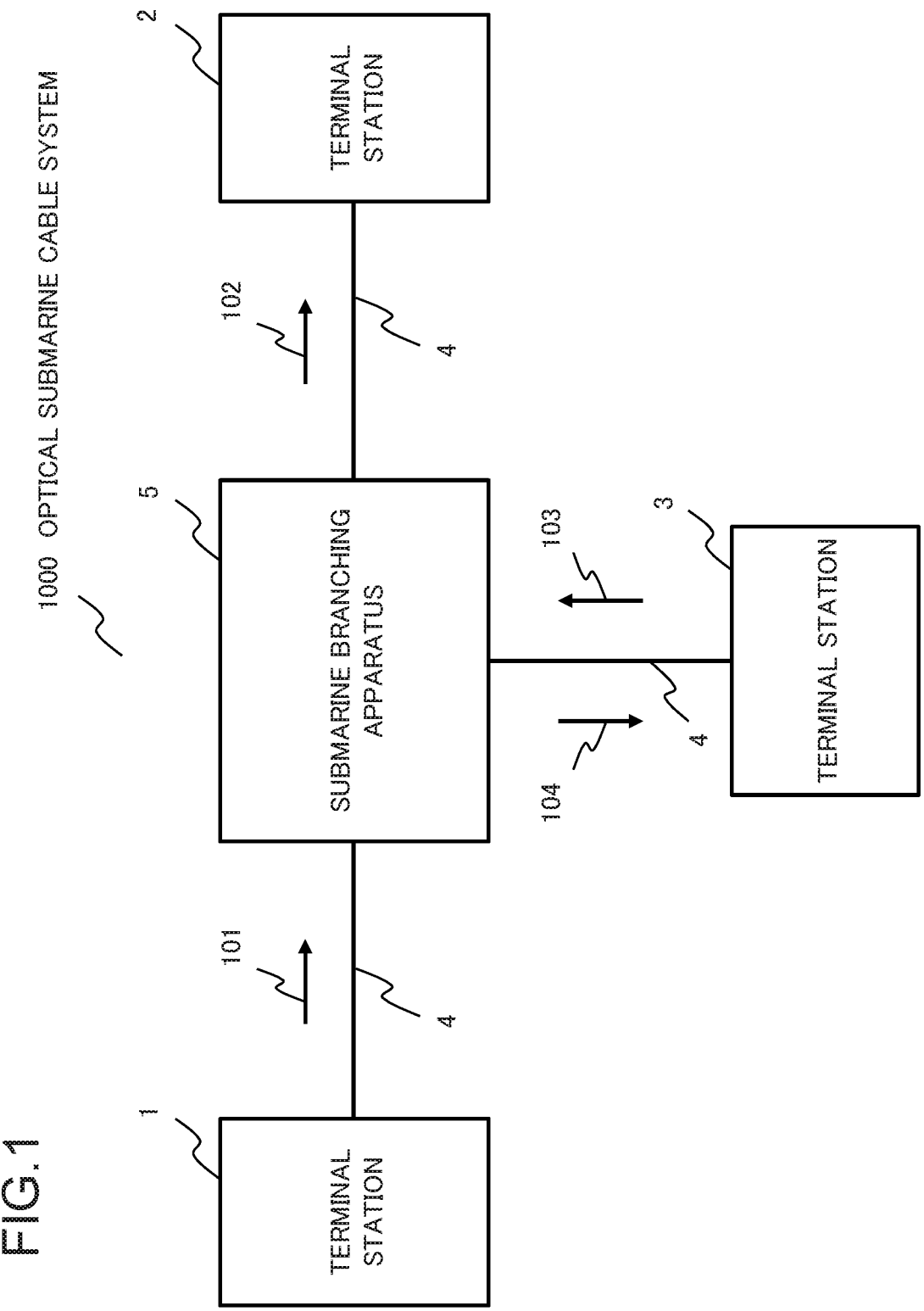
FIG. 1 is a diagram illustrating a configuration example of an optical submarine cable system according to a first example embodiment.

FIG. 1 illustrates a configuration example of an optical submarine cable system according to a first example embodiment of the present invention. The optical submarine cable system 1000 in FIG. 1 includes a terminal station 1, a terminal station 2, a terminal station 3, an optical submarine cable 4, and a submarine branching apparatus 5. The terminal station 1, the terminal station 2, the terminal station 3, and the submarine branching apparatus 5 are mutually coupled through the optical submarine cable 4. Each of the terminal stations 1, 2, and 3 is a station office installed on land and includes an optical communication device capable of transmitting and receiving optical signals. The terminal stations 1, 2, and 3 perform transmission of WDM signals through the optical submarine cable 4.

The submarine branching apparatus 5 has a function of adding and dropping wavelength-multiplexed optical signals. A WDM signal 101 and a WDM signal 103 are input to the submarine branching apparatus 5 from the terminal station 1 and the terminal station 3, respectively. Further, the submarine branching apparatus 5 outputs a WDM signal 102 and a WDM signal 104 to the terminal station 2 and the terminal station 3, respectively. While FIG. 1 illustrates a signal transmitted in a direction (upstream direction) from the terminal station 1 to the terminal station 2, an unillustrated signal is also transmitted in a direction (downstream direction) from the terminal station 2 to the terminal station 1 through the optical submarine cable 4. The optical submarine cable 4 may be composed of a plurality of fibers, and a signal in the upstream direction and a signal in the downstream direction may be transmitted through different fibers. Further, each of the upstream direction and the downstream direction may be configured with a plurality of optical fibers. Furthermore, submarine repeaters each including an amplifier, or the like may be arranged between the terminal stations 1, 2, and 3, and the submarine branching apparatus 5.

Figure 2:
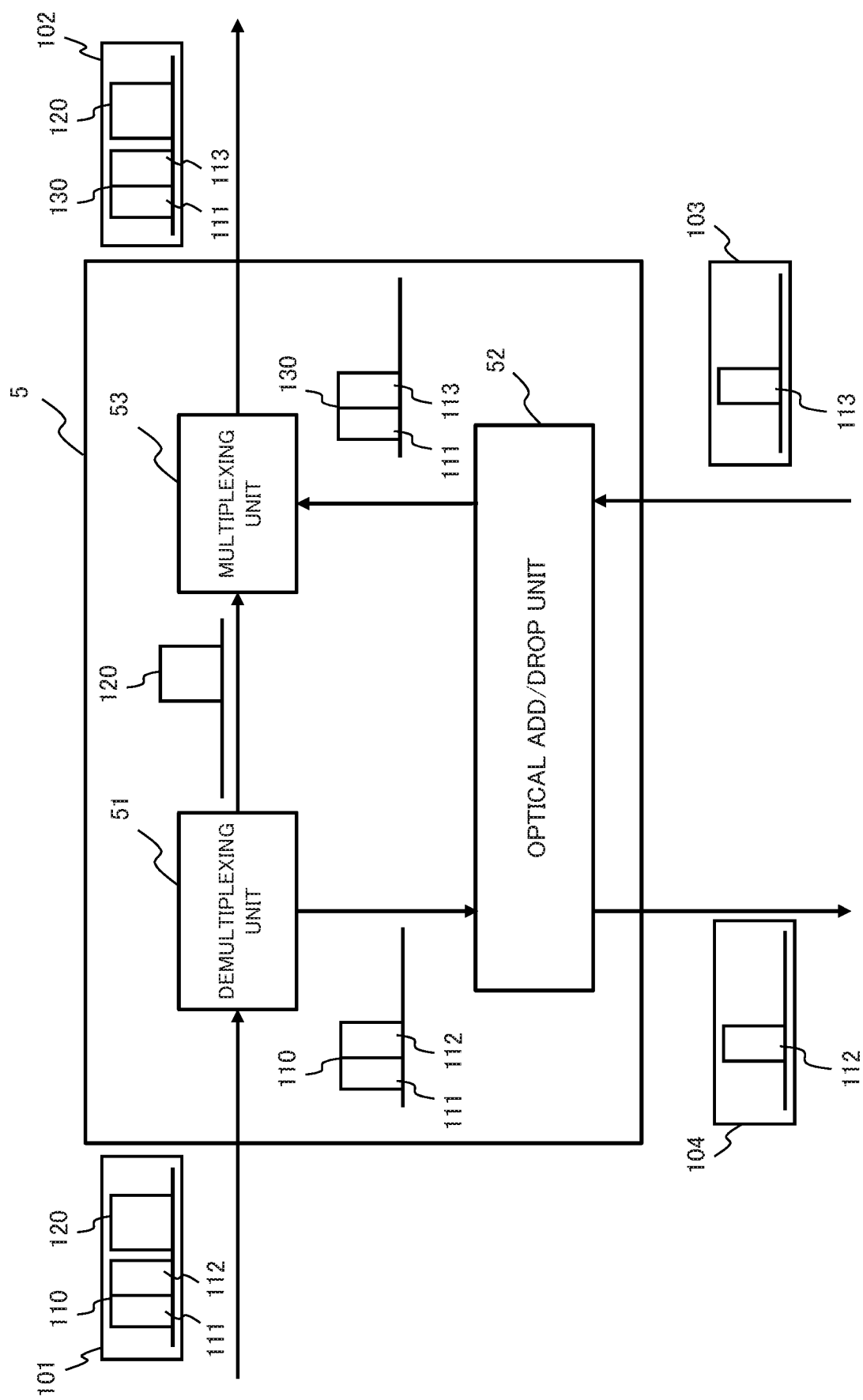
FIG. 2 is a diagram illustrating a configuration example of a submarine branching apparatus according to the first example embodiment.

FIG. 2 illustrates a configuration example of the submarine branching apparatus 5 according to the first example embodiment. According to FIG. 2, the submarine branching apparatus 5 includes a demultiplexing unit 51, an optical add/drop unit 52, and a multiplexing unit 53. An arrow illustrated in FIG. 2 indicates a transmission direction of a WDM signal. While the C-band and the L-band will be described as an example of a plurality of wavelength bands in the following description about the present example embodiment, a plurality of wavelength bands applied to the present example embodiment is not limited thereto.

The demultiplexing unit 51 demultiplexes a WDM signal 101 input from the terminal station 1. The WDM signal 101 includes a WDM signal (C-band signal) 110 having a C-band wavelength and a WDM signal (L-band signal) 120 having an L-band wavelength. The demultiplexing unit 51 demultiplexes the WDM signal 101 into the C-band signal 110 and the L-band signal 120, outputs the C-band signal 110 to the optical add/drop unit 52, and outputs the L-band signal 120 to the multiplexing unit 53. For example, the demultiplexing unit 51 may be a wavelength selective switch (WSS) selectively switching a wavelength output to a specific port, an optical filter selectively transmitting or reflecting a specific wavelength, or a combination of an optical coupler and an optical filter selectively transmitting a specific wavelength. Further, a wavelength band demultiplexed by the demultiplexing unit 51 may be changeable. A change of a wavelength band may be performed based on control from an unillustrated control device.

The optical add/drop unit 52 has a function of adding/dropping a specific wavelength. The C-band signal 110 input to the optical add/drop unit 52 includes a band signal 111 and a band signal 112. The optical add/drop unit 52 outputs the WDM signal 104 including the band signal 112 included in the C-band signal 110 to the terminal station 3. Further, the optical add/drop unit 52 multiplexes the band signal 111 included in the C-band signal 110 and a band signal 113 included in the WDM signal 103 input from the terminal station 3, and outputs a C-band signal 130 to the multiplexing unit 53. Each of the band signals 111, 112, and 113 may be a WDM signal or a single-wavelength signal. Further, data to be received by the terminal station 2 may be superposed on the band signals 111 and 113. Data to be received by the terminal station 3 may be superposed on the band signal 112. Wavelength bands of the band signal 111 and the band signal 112 are not limited to be uniform as illustrated in FIG. 2. Further, a wavelength band added/dropped by the optical add/drop unit 52 may be changeable. A change of a wavelength band may be performed based on control from an unillustrated control device.

The WDM signal 104 output to the terminal station 3 by the optical add/drop unit 52 has only to include at least the band signal 112. Accordingly, for example, the optical add/drop unit 52 may output the WDM signal 104 including the band signal 111 and the band signal 112 to the terminal station 3. Further, while the WDM signal 103 input to the optical add/drop unit 52 may include a dummy signal having a wavelength band corresponding to the band signal 111, the optical add/drop unit 52 may output the WDM signal 104 including the dummy signal and the band signal 112 to the terminal station 3 in this case.

The multiplexing unit 53 multiplexes the L-band signal 120 input from the demultiplexing unit 51 and the C-band signal 130 input from the optical add/drop unit 52, and outputs the WDM signal 102 to the terminal station 2. For example, the multiplexing unit 53 may be a WSS or an optical coupler.

Operation

Figure 3:
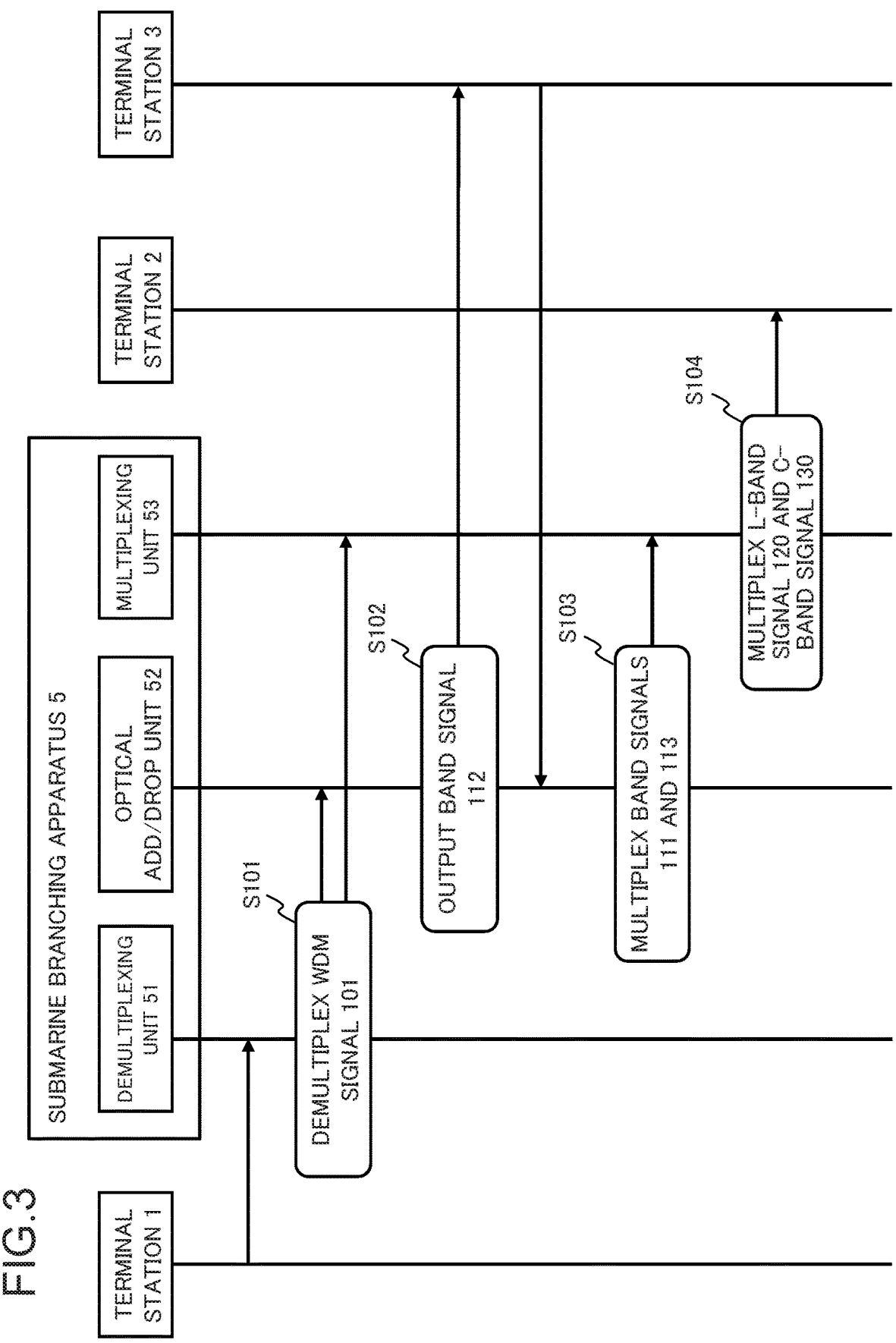
FIG. 3 is a sequence diagram illustrating an operation example of the submarine branching apparatus according to the first example embodiment.

An operation example of the submarine branching apparatus according to the first example embodiment will be described below by use of FIG. 3.

The demultiplexing unit 51 demultiplexes the WDM signal 101 input from the terminal station 1 into the C-band signal 110 and the L-band signal 120 (S101).

The optical add/drop unit 52 outputs the WDM signal 104 including the band signal 112 included in the C-band signal 110 to the terminal station 3 (S102).

The optical add/drop unit 52 outputs the C-band signal 130 in which the band signal 111 included in the C-band signal 110 and the band signal 113 included in the WDM signal 103 input from the terminal station 3 are multiplexed to the multiplexing unit 53 (S103). An execution order of S102 and S103 is not limited, and S102 may be executed after S103 is executed. Further, S102 and S103 may be executed simultaneously.

The multiplexing unit 53 multiplexes the L-band signal 120 input from the demultiplexing unit 51 and the C-band signal 130 input from the optical add/drop unit 52, and outputs the WDM signal 102 to the terminal station 2 (S104).

Effect

The submarine branching apparatus according to the present example embodiment demultiplexes an input WDM signal into a plurality of wavelength bands, such as a C-band signal and an L-band signal, and performs add/drop on one of the signals. Consequently, an output destination of the WDM signal including a plurality of wavelength bands can be controlled on a per-wavelength basis. Accordingly, a submarine branching apparatus capable of providing an optical transmission system using a plurality of wavelength bands can be provided.

As illustrated in the present example embodiment, by demultiplexing an input WDM signal into a C-band signal and an L-band signal, an output destination of a WDM signal including a C-band signal and an L-band signal can be controlled on a per-wavelength basis. Consequently, an output destination of a WDM signal including a C-band signal and an L-band signal can be controlled on a per-wavelength basis. Accordingly, a submarine branching apparatus capable of providing an optical transmission system using the C-band and the L-band can be provided.

While it is assumed that the submarine branching apparatus according to the present example embodiment performs add/drop on a C-band signal, add/drop may be performed on an L-band signal. In this case, the demultiplexing unit 51 outputs the L-band signal 120 to the optical add/drop unit 52, and the optical add/drop unit 52 performs add/drop on the L-band signal 120. Further, a wavelength band on which the submarine branching apparatus performs add/drop may be set during manufacture or may be dynamically controlled. A change of a wavelength band may be performed based on control from an unillustrated control device.

When add/drop is performed on a C-band signal, the optical add/drop unit 52 in the submarine branching apparatus according to the present example embodiment may be applied to part of an OADM device or a ROADM device used in a C-band optical transmission system. Consequently, an effect of reduction in a manufacturing cost of a submarine branching apparatus applicable to an optical transmission system using the C-band and the L-band is provided.

While a signal output in the direction (upstream direction) from the terminal station 1 to the terminal station 2 has been described in the present example embodiment, the same may similarly apply to a signal output in the direction (downstream direction) from the terminal station 2 to the terminal station 1.

Second Example Embodiment

Configuration

A second example embodiment of the present invention will be described. A submarine branching apparatus according to the second example embodiment of the present invention is configured to be capable of flexibly controlling an output destination of an input wavelength-multiplexed optical signal on a per-wavelength basis. Description of a configuration according to the second example embodiment of the present invention similar to that according to the first example embodiment of the present invention is omitted.

A configuration example of an optical submarine cable system according to the second example embodiment of the present invention is similar to the configuration example of the optical submarine cable system 1000 illustrated in FIG. 1.

Figure 4:
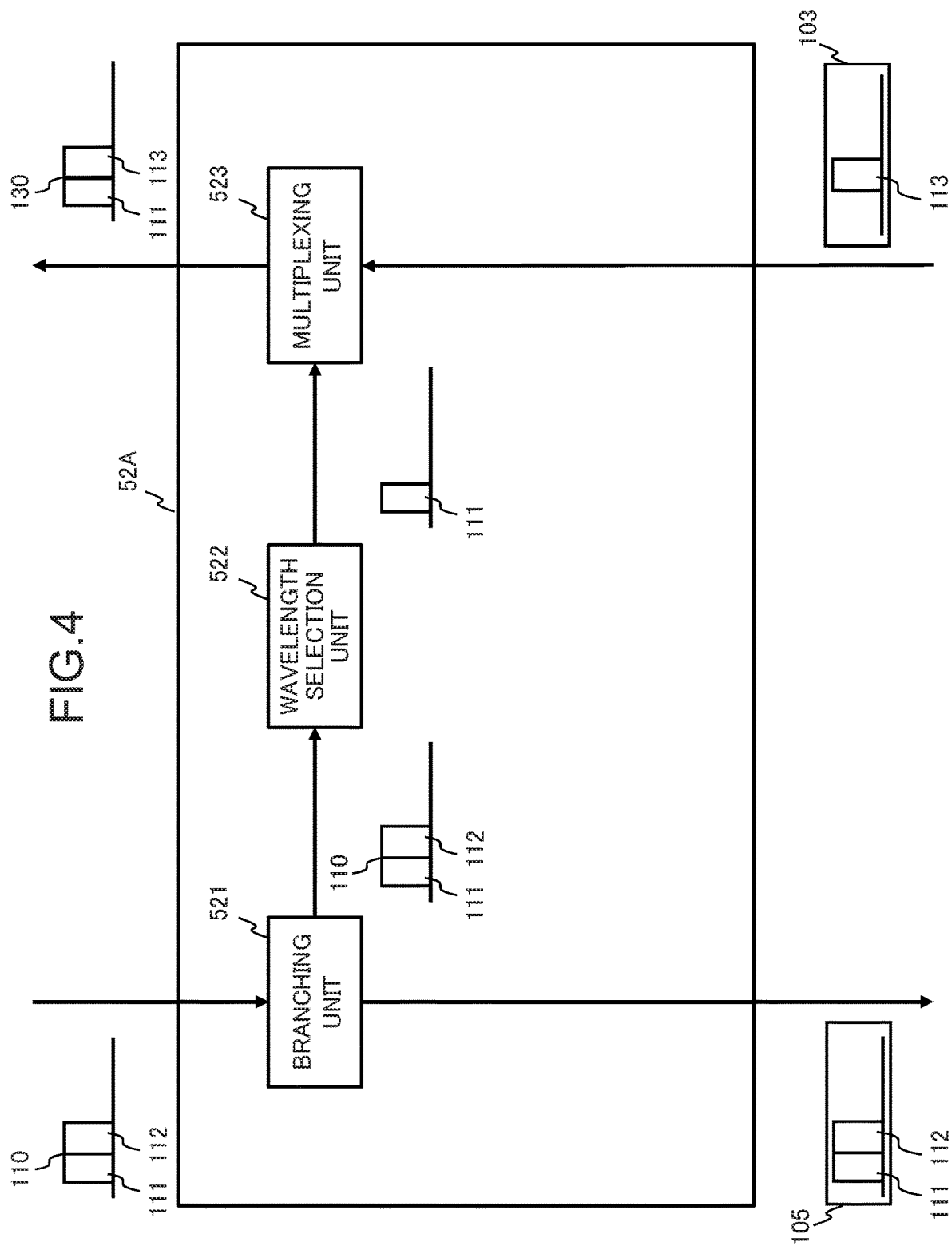
FIG. 4 is a diagram illustrating a configuration example of an optical add/drop unit according to a second example embodiment.

Compared with the configuration illustrated in FIG. 2, the submarine branching apparatus according to the second example embodiment of the present invention includes an optical add/drop unit 52A in place of the optical add/drop unit 52. The optical add/drop unit 52A is configured to be capable of flexibly controlling an output destination of an input wavelength-multiplexed optical signal on a per-wavelength basis. FIG. 4 illustrates a configuration example of the optical add/drop unit 52A according to the second example embodiment of the present invention. The optical add/drop unit 52A includes a branching unit 521, a wavelength selection unit 522, and a multiplexing unit 523.

The branching unit 521 splits a C-band signal 110 input from a demultiplexing unit 51. The branching unit 521 outputs one of the split C-band signal 110 to the wavelength selection unit 522. Further, the branching unit 521 outputs the other of the split C-band signal 110 to the terminal station 3 as a WDM signal 105. For example, the branching unit 521 may be an optical coupler.

The wavelength selection unit 522 transmits a band signal 111 included in the C-band signal 110 input from the branching unit 521. The wavelength selection unit 522 outputs the transmitted band signal 111 to the multiplexing unit 523. Further, the wavelength selection unit 522 may block a band signal 112 included in the C-band signal 110 input from the branching unit 521. The wavelength selection unit 522 may be an optical filter selectively transmitting a specific wavelength and blocking the other wavelength bands. Further, a wavelength band transmitted by the wavelength selection unit 522 may be changeable. A change of a wavelength band may be performed based on control from an unillustrated control device.

The multiplexing unit 523 multiplexes the band signal 111 input from the wavelength selection unit 522 and a band signal 113 included in the WDM signal 103 input from the terminal station 3, and outputs a C-band signal 130. For example, the multiplexing unit 523 may be an optical coupler.

The wavelength selection unit 522 and the multiplexing unit 523 may be a WSS having the aforementioned functions altogether. In this case, the WSS performs add/drop on the input C-band signal 110 and the input WDM signal 103, and outputs the C-band signal 130.

Operation

Figure 5:
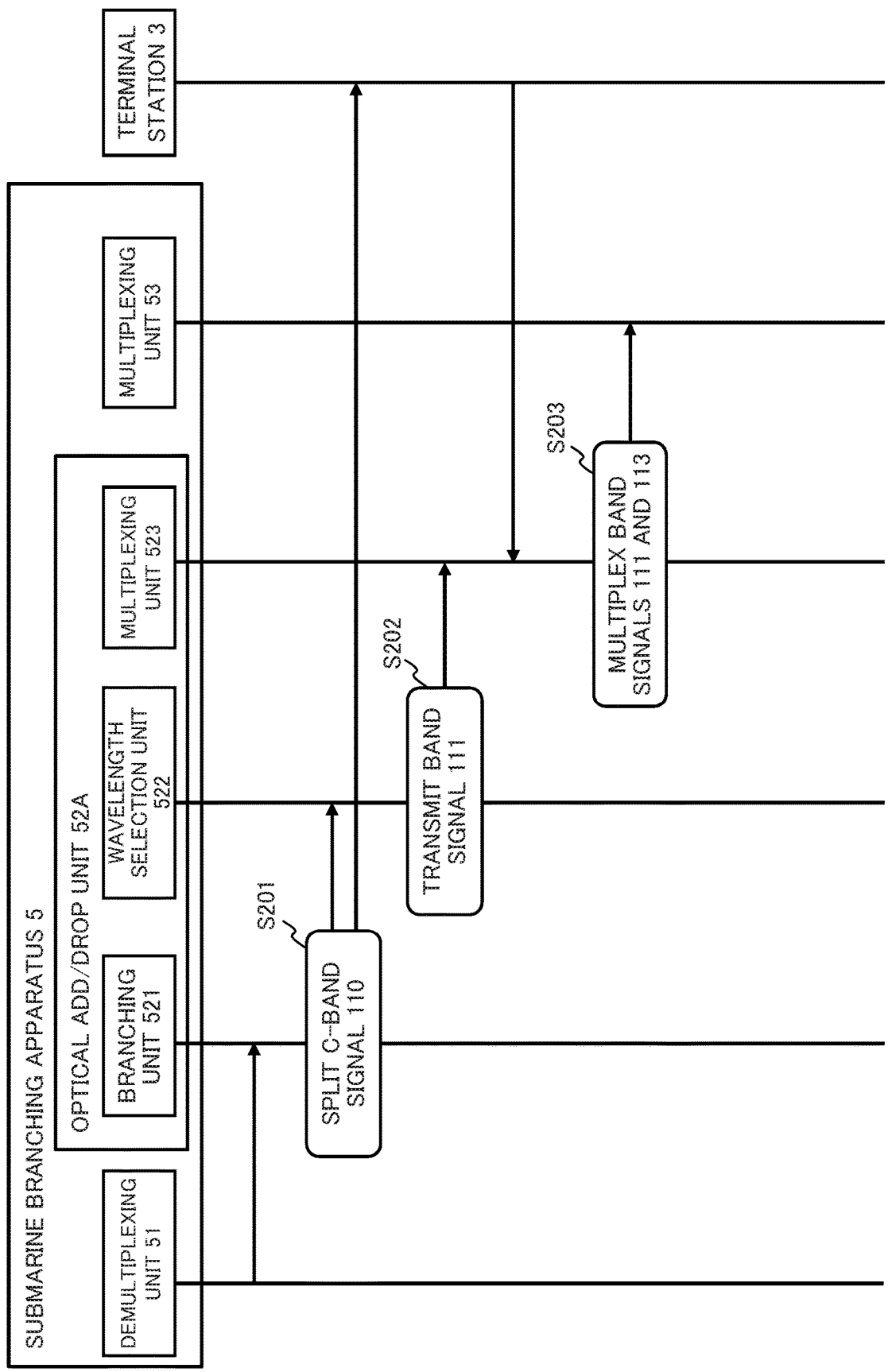
FIG. 5 is a sequence diagram illustrating an operation example of the optical add/drop unit according to the second example embodiment.

An operation example of the optical add/drop unit 52A according to the second example embodiment will be described below by use of FIG. 5. Description of an operation example according to the second example embodiment of the present invention similar to that according to the first example embodiment of the present invention is omitted.

The branching unit 521 splits the C-band signal 110 input from the demultiplexing unit 51 to the optical add/drop unit 52A (S201).

The wavelength selection unit 522 transmits the band signal 111 included in the C-band signal 110 input from the branching unit 521 (S202).

The multiplexing unit 523 multiplexes the band signal 111 input from the wavelength selection unit 522 and the band signal 113 included in the WDM signal 103, and outputs the multiplexed signal to the multiplexing unit 53 as the C-band signal 130 (S203).

Effect

The optical add/drop unit according to the present example embodiment is configured to be capable of selectively transmitting a band signal included in an input C-band signal and outputting a WDM signal including the transmitted band signal. Consequently, an output destination of a WDM signal can be flexibly controlled on a per-wavelength basis. Accordingly, a submarine branching apparatus capable of providing an optical transmission system using the C-band and the L-band can be provided.

Third Example Embodiment

Configuration

A third example embodiment of the present invention will be described. A submarine branching apparatus according to the third example embodiment of the present invention is configured to be capable of securing data confidentiality. Description of a configuration according to the third example embodiment of the present invention similar to that according to another example embodiment of the present invention is omitted.

A configuration example of an optical submarine cable system according to the third example embodiment of the present invention is similar to the configuration example of the optical submarine cable system 1000 illustrated in FIG. 1.

The optical add/drop unit 52 according to the aforementioned second example embodiment of the present invention outputs the WDM signal 104 including the band signal 111 to the terminal station 3. While data to be received by the terminal station 2 may be superposed on the band signal 111, the band signal 111 is output to the terminal station 3 not being an original destination.

Then, the submarine branching apparatus according to the third example embodiment of the present invention performs predetermined waveform processing on a band signal on which data to be received by the terminal station 2 are superposed. Consequently, even when a signal is output to a terminal station not being an original destination, data confidentiality can be secured.

Figure 6:
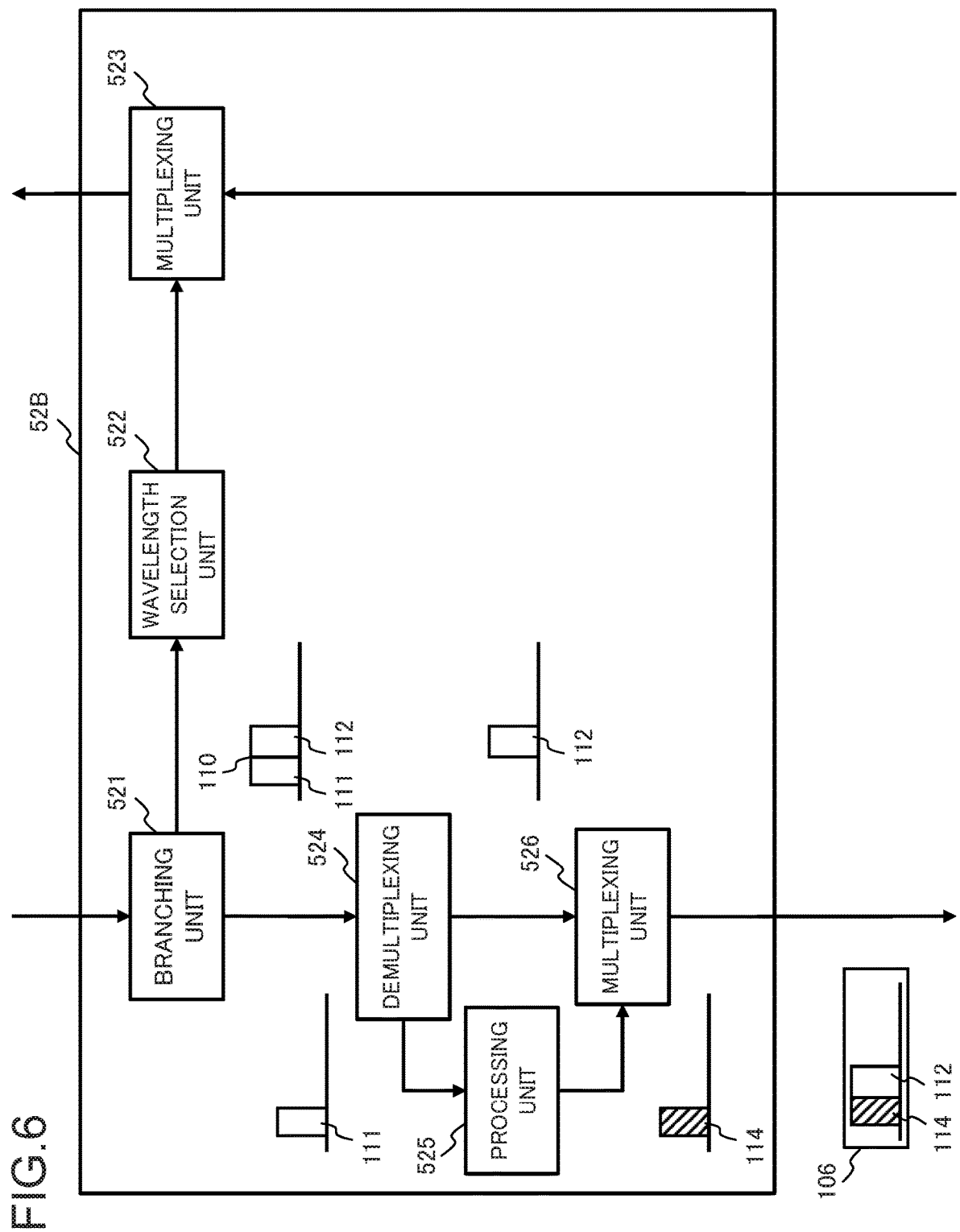
FIG. 6 is a diagram illustrating a configuration example of an optical add/drop unit according to a third example embodiment.

Compared with the configuration illustrated in FIG. 2, the submarine branching apparatus according to the third example embodiment of the present invention includes an optical add/drop unit 52B in place of the optical add/drop unit 52. FIG. 6 illustrates a configuration example of the optical add/drop unit 52 according to the third example embodiment of the present invention. In addition to the configuration illustrated in FIG. 4, the optical add/drop unit 52B includes a demultiplexing unit 524, a processing unit 525, and a multiplexing unit 526.

The demultiplexing unit 524 demultiplexes a C-band signal 110 input from a branching unit 521 into a band signal 111 and a band signal 112. The demultiplexing unit 524 outputs the band signal 111 to the processing unit 525 and outputs the band signal 112 to the multiplexing unit 526. For example, the demultiplexing unit 524 may be a WSS selectively switching a wavelength output to a specific port, an optical filter selectively transmitting or reflecting a specific wavelength, or a combination of an optical coupler and an optical filter selectively transmitting a specific wavelength. Further, a wavelength band demultiplexed by the demultiplexing unit 51 may be changeable. A change of a wavelength band may be performed based on control from an unillustrated control device.

The processing unit 525 generates a processed signal 114 by applying predetermined waveform processing to the band signal 111 input from the demultiplexing unit 524. The processing unit 525 outputs the processed signal 114 to the multiplexing unit 526. The processing unit 525 may add a predetermined pattern to the band signal 111 as the predetermined waveform processing. For example, the predetermined pattern may be a dummy pattern randomly arranging 0 and 1, or a fixed pattern arranging 0 and 1 in a specific pattern. Further, the processing unit 525 may perform scrambling processing on the band signal 111 as the predetermined waveform processing. Further, the processing unit 525 may degrade a transmission characteristic of the band signal 111 as the predetermined waveform processing. Furthermore, the processing unit 525 may delay the band signal 111 and cause the multiplexing unit 526 to multiplex the delayed signal as a delayed optical signal. The predetermined waveform processing executed by the processing unit 525 may be changeable. A change of the waveform processing may be performed based on control from an unillustrated control device.

The multiplexing unit 526 multiplexes the band signal 112 and the processed signal 114, and outputs the multiplexed signal to the terminal station 3 as a WDM signal 106. The multiplexing unit 526 may be an optical coupler.

Operation

Figure 7:
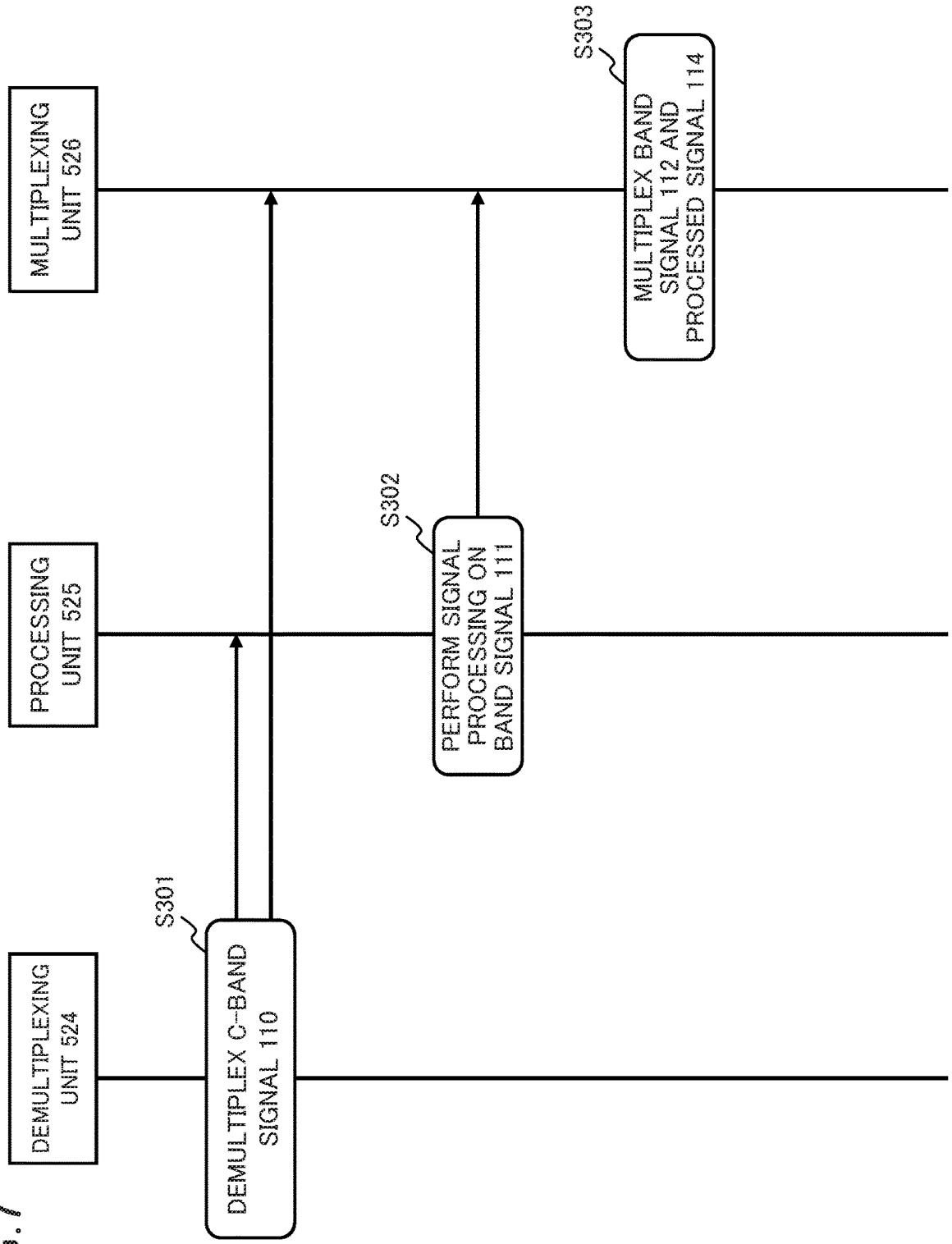
FIG. 7 is a sequence diagram illustrating an operation example of the optical add/drop unit according to the third example embodiment.

Operation examples of the demultiplexing unit 524, the processing unit 525, and the multiplexing unit 526, according to the third example embodiment, will be described below by use of FIG. 7. An operation example of a configuration not illustrated in FIG. 7 is similar to that according to the second example embodiment, and therefore description thereof is omitted.

The demultiplexing unit 524 demultiplexes the C-band signal 110 input from the branching unit 521 into the band signal 111 and the band signal 112 (S301).

The processing unit 525 generates the processed signal 114 by applying the predetermined waveform processing to the band signal 111 input from the demultiplexing unit 524 (S302).

The multiplexing unit 526 multiplexes the band signal 112 input from the demultiplexing unit 524 and the processed signal 114 input from the processing unit 525 (S303).

Effect

The optical add/drop unit according to the present example embodiment is configured to apply predetermined waveform processing to a signal on which data output to a terminal station not being an original destination are superposed. Consequently, the data cannot be extracted from the signal to which the waveform processing is applied, at the terminal station not being the original destination. Accordingly, an effect of allowing secured data confidentiality while achieving flexible signal transmission control is provided.

Fourth Example Embodiment

Configuration

A fourth example embodiment of the present invention will be described. A submarine branching apparatus according to the fourth example embodiment of the present invention is configured to be capable of compensating for intensity of a WDM signal by use of a dummy signal. Description of a configuration according to the fourth example embodiment of the present invention similar to that according to another example embodiment of the present invention is omitted.

A configuration example of an optical submarine cable system according to the fourth example embodiment of the present invention is similar to the configuration example of the optical submarine cable system 1000 illustrated in FIG. 1.

A WDM signal input to a submarine branching apparatus 5 from the terminal station 3 may include a dummy signal, according to the fourth example embodiment. A dummy signal is a signal multiplexed to a band signal on which data are superposed, in order to compensate for signal intensity. The submarine branching apparatus according to the fourth example embodiment of the present invention is configured to multiplex a dummy signal input from the terminal station 3 to a WDM signal output to the terminal station 3. Consequently, intensity of the WDM signal output to the terminal station 3 from the submarine branching apparatus can be compensated for.

Figure 8:
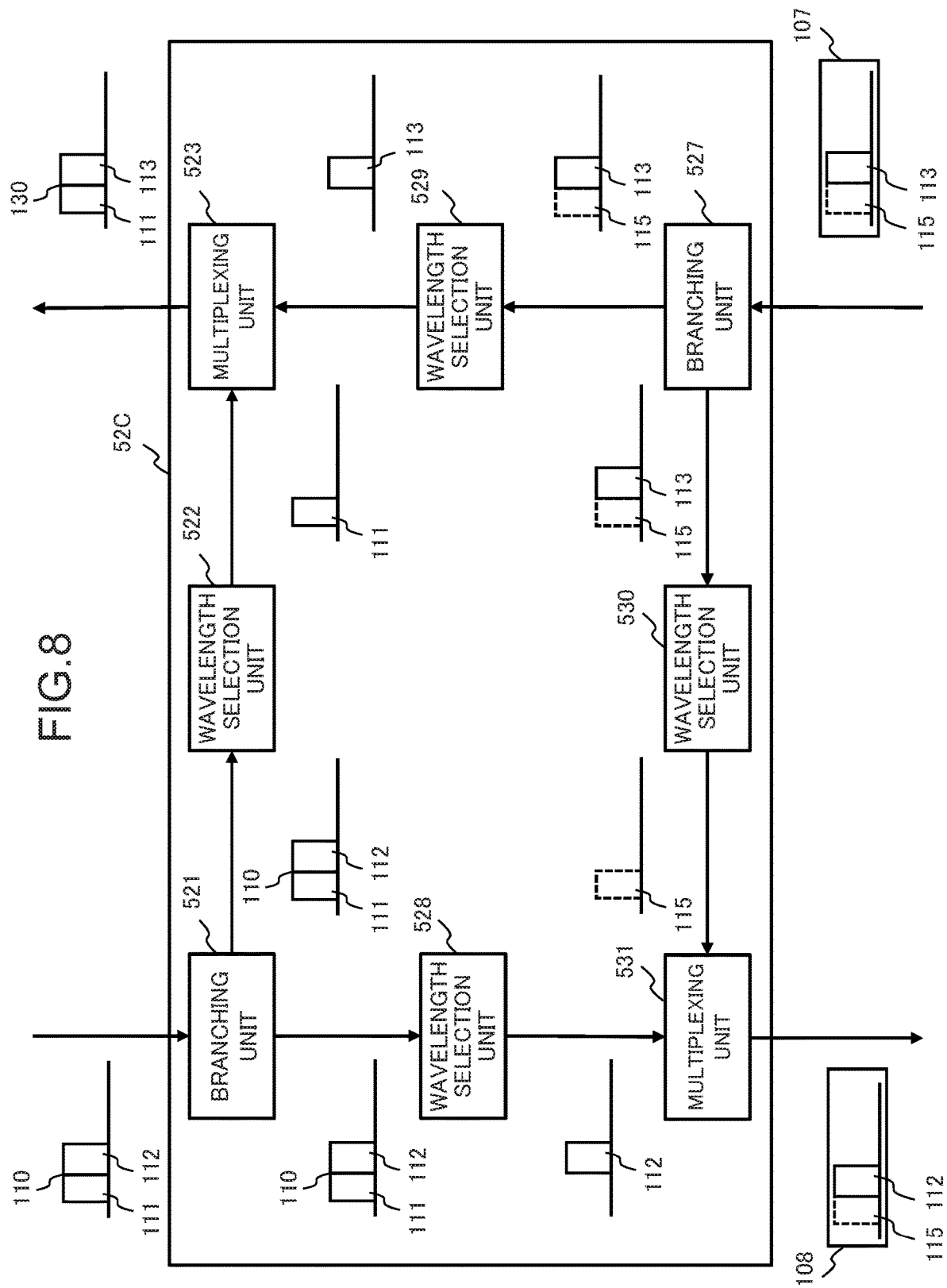
FIG. 8 is a diagram illustrating a configuration example of an optical add/drop unit according to a fourth example embodiment.

Compared with the configuration illustrated in FIG. 2, the submarine branching apparatus according to the fourth example embodiment of the present invention includes an optical add/drop unit 52C in place of the optical add/drop unit 52. FIG. 8 illustrates a configuration example of the optical add/drop unit 52C according to the fourth example embodiment of the present invention. In addition to the configuration illustrated in FIG. 4, the optical add/drop unit 52C includes a branching unit 527, wavelength selection units 528, 529, and 530, and a multiplexing unit 531. Further, a WDM signal 107 input from the terminal station 3 includes a dummy signal 115. Further, a WDM signal 108 output to the terminal station 3 includes the dummy signal 115. The dummy signal 115 may have a wavelength band corresponding to a wavelength band of a band signal 111.

The branching unit 527 splits the WDM signal 107 input from the terminal station 3. The branching unit 527 outputs the split WDM signals 107 to the wavelength selection units 529 and 530. The branching unit 527 may be an optical coupler.

Each of the wavelength selection units 528, 529, and 530 transmits a signal at a specific wavelength in an input signal. The wavelength selection unit 528 transmits a band signal 112 in a C-band signal 110 input from the branching unit 521. The wavelength selection unit 529 transmits a band signal 113 in a WDM signal input from the branching unit 527. The wavelength selection unit 530 transmits the dummy signal 115 in the WDM signal input from the branching unit 527. Each of the wavelength selection units 528, 529, and 530 may block a band signal not to be transmitted. Further, each of the wavelength selection units 528, 529, and 530 may be an optical filter selectively transmitting a specific wavelength. Further, a wavelength band transmitted by each of the wavelength selection units 528, 529, and 530 may be changeable. A change of a wavelength band may be performed based on control from an unillustrated control device.

The multiplexing unit 531 multiplexes the band signal 112 input from the wavelength selection unit 528 and the dummy signal 115 input from the wavelength selection unit 530, and outputs the WDM signal 108 to the terminal station 3. For example, the multiplexing unit 531 may be an optical coupler.

Operation

Figure 9:
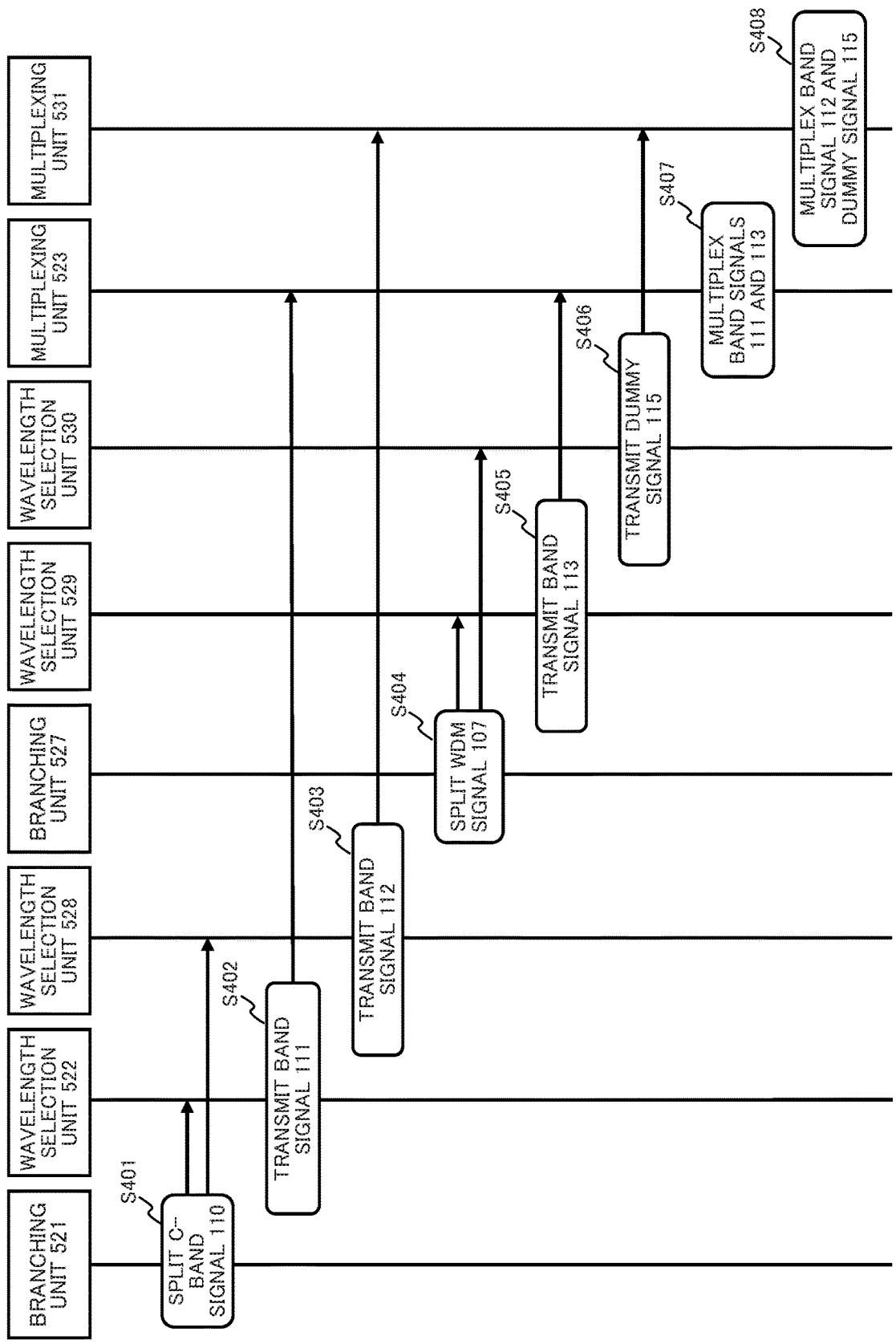
FIG. 9 is a sequence diagram illustrating an operation example of the optical add/drop unit according to the fourth example embodiment.

An operation example of the optical add/drop unit 52C according to the fourth example embodiment will be described below by use of FIG. 9. An operation example of a configuration not illustrated in FIG. 9 is similar to that according to the first example embodiment, and therefore description thereof is omitted.

The branching unit 521 splits the C-band signal 110 input from the demultiplexing unit 51 (S401).

The wavelength selection unit 522 transmits the band signal 111 included in the split C-band signal 110 (S402).

The wavelength selection unit 528 transmits the band signal 112 included in the split C-band signal 110 (S403).

The branching unit 527 splits the WDM signal 107 input from the terminal station 3 (S404).

The wavelength selection unit 529 transmits the band signal 113 included in the split WDM signal 107 (S405).

The wavelength selection unit 530 transmits the dummy signal 115 included in the split WDM signal 107 (S406).

The multiplexing unit 523 multiplexes the band signal 111 and the band signal 113 (S407).

The multiplexing unit 531 multiplexes the band signal 112 and the dummy signal 115 (S408).

Effect

The submarine branching apparatus according to the fourth example embodiment of the present invention is configured to output a WDM signal to which an input dummy signal is multiplexed. Consequently, intensity of the WDM signal output from the submarine branching apparatus can be compensated for. In this case, even when an optical signal is amplified in a submarine repeater or the like being an output destination, excessive amplification of the optical signal can be prevented by the dummy signal, and by extension, degradation of the optical signal due to a nonlinear effect can be prevented.

Fifth Example Embodiment

Configuration

A fifth example embodiment of the present invention will be described. A submarine branching apparatus according to the fifth example embodiment of the present invention is configured to add/drop an L-band signal. Description of a configuration according to the fifth example embodiment of the present invention similar to that according to another example embodiment of the present invention is omitted.

A configuration example of an optical submarine cable system according to the fifth example embodiment of the present invention is similar to the configuration example of the optical submarine cable system 1000 illustrated in FIG. 1.

The submarine branching apparatuses according to the aforementioned example embodiments perform add/drop on a C-band signal. However, the submarine branching apparatuses do not have a function of adding/dropping an L-band signal.

Then, the submarine branching apparatus according to the fifth example embodiment of the present invention is configured to add/drop an L-band signal. Consequently, flexible transmission control of a WDM signal in an optical transmission system using the C-band and the L-band can be achieved.

Figure 10:
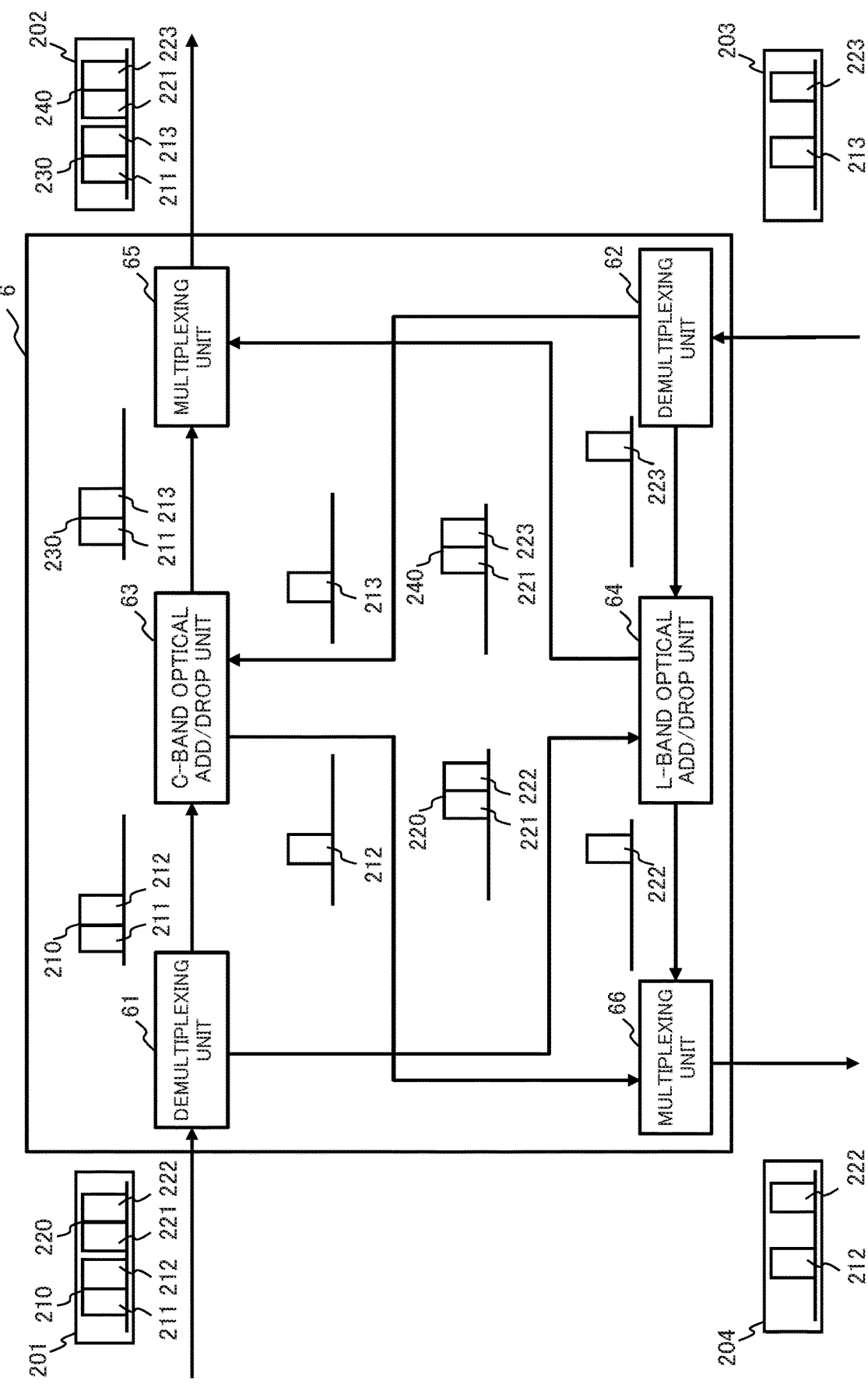
FIG. 10 is a diagram illustrating a configuration example of a submarine branching apparatus according to a fifth example embodiment.

FIG. 10 illustrates a configuration example of the submarine branching apparatus according to the fifth example embodiment of the present invention. The submarine branching apparatus 6 in FIG. 10 includes demultiplexing units 61 and 62, a C-band optical add/drop unit 63, an L-band optical add/drop unit 64, and multiplexing units 65 and 66. Further, a WDM signal 201 output from the terminal station 1 is input to the submarine branching apparatus 6. Further, a WDM signal 203 output from the terminal station 3 is input to the submarine branching apparatus 6.

The demultiplexing unit 61 demultiplexes the WDM signal 201 input from the terminal station 1 into a C-band signal 210 and an L-band signal 220. The demultiplexing unit 61 outputs the C-band signal 210 to the C-band optical add/drop unit 63. Further, the demultiplexing unit 61 outputs the L-band signal 220 to the L-band optical add/drop unit 64.

The demultiplexing unit 62 demultiplexes the WDM signal 203 input from the terminal station 3 into a C-band signal 213 and an L-band signal 223. The demultiplexing unit 62 outputs the C-band signal 213 to the C-band optical add/drop unit 63. Further, the demultiplexing unit 62 outputs the L-band signal 223 to the L-band optical add/drop unit 64.

For example, each of the demultiplexing units 61 and 62 may be a WSS selectively switching a wavelength output to a specific port, an optical filter selectively transmitting or reflecting a specific wavelength, or a combination of an optical coupler and an optical filter selectively transmitting a specific wavelength. Further, a wavelength band demultiplexed by each of the demultiplexing units 61 and 62 may be changeable. A change of a wavelength band may be performed based on control from an unillustrated control device.

The C-band optical add/drop unit 63 performs add/drop on a C-band signal. The C-band optical add/drop unit 63 outputs a band signal 212 included in the C-band signal 210 input from the demultiplexing unit 61 to the multiplexing unit 66. Further, the C-band optical add/drop unit 63 multiplexes a band signal 211 included in the C-band signal 210 and the C-band signal 213, and outputs a C-band signal 230 to the multiplexing unit 65.

The L-band optical add/drop unit 64 performs add/drop on an L-band signal. The L-band optical add/drop unit 64 outputs a band signal 222 in the L-band signal 220 input from the demultiplexing unit 61 to the multiplexing unit 66. Further, the L-band optical add/drop unit 64 multiplexes a band signal 221 in the L-band signal 220 input from the demultiplexing unit 61 and the L-band signal 223 input from the demultiplexing unit 62, and outputs an L-band signal 240 to the multiplexing unit 65.

The multiplexing unit 65 multiplexes the C-band signal 230 input from the C-band optical add/drop unit 63 and the L-band signal 240 input from the L-band optical add unit, and outputs the multiplexed signal to the terminal station 2 as a WDM signal 202.

The multiplexing unit 66 multiplexes the band signal 212 input from the C-band optical add/drop unit 63 and the band signal 222 input from the L-band optical add/drop unit 64, and outputs the multiplexed signal to the terminal station 3 as a WDM signal 204.

Operation

Figure 11:
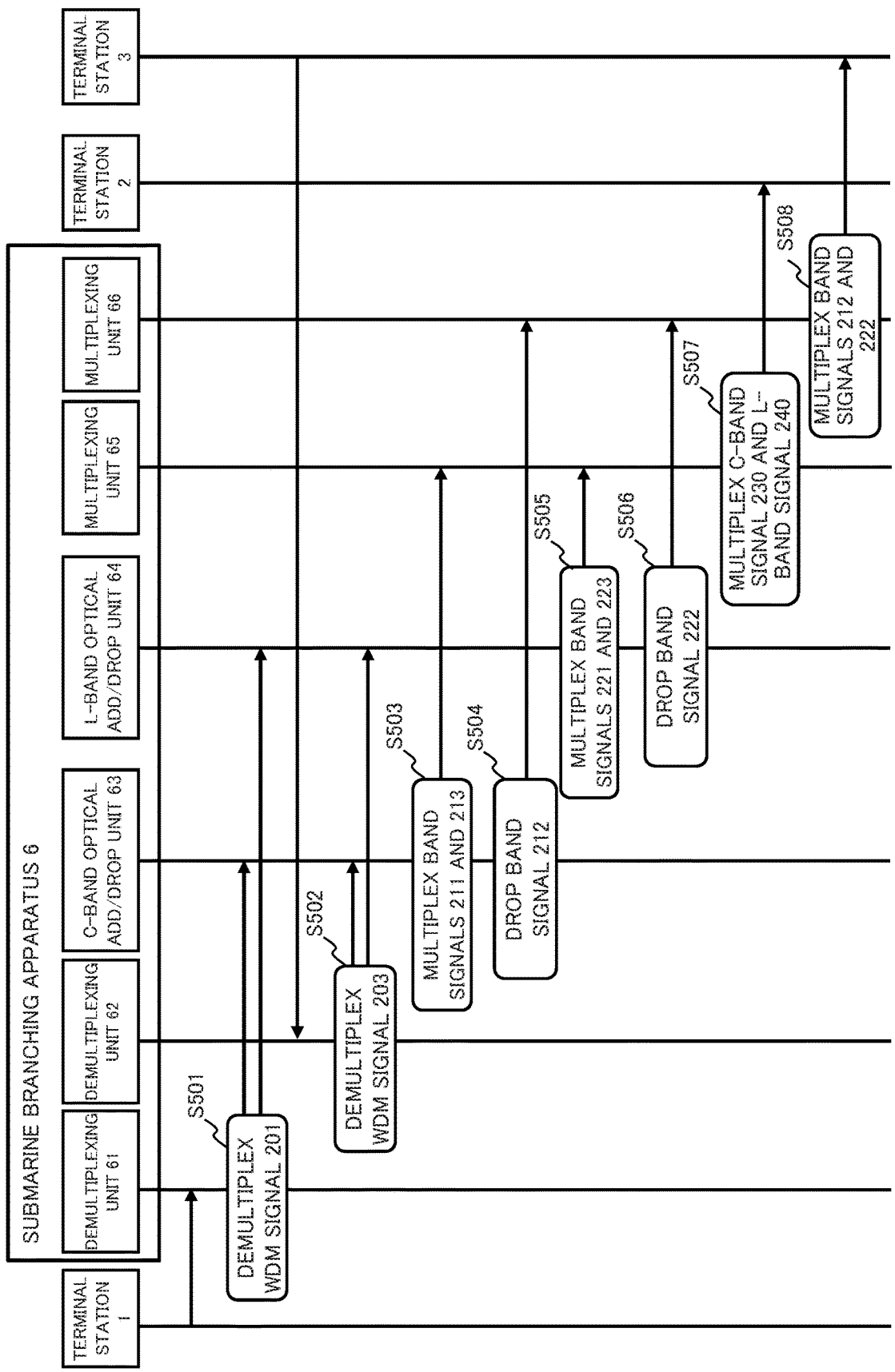
FIG. 11 is a sequence diagram illustrating an operation example of the submarine branching apparatus according to the fifth example embodiment.

An operation example of the submarine branching apparatus according to the fifth example embodiment will be described below by use of FIG. 11.

The demultiplexing unit 61 demultiplexes the WDM signal 201 input from the terminal station 1 into the C-band signal 210 and the L-band signal 220 (S501).

The demultiplexing unit 62 demultiplexes the WDM signal 203 input from the terminal station 3 into the C-band signal 213 and the L-band signal 223 (S502).

The C-band optical add/drop unit 63 multiplexes the band signal 211 included in the C-band signal 210 and the C-band signal 213, and outputs the C-band signal 230 to the multiplexing unit 65 (S503).

Further, the C-band optical add/drop unit 63 drops the band signal 212 included in the C-band signal 210 input from the demultiplexing unit 61 and outputs the band signal 212 to the multiplexing unit 66 (S504).

The L-band optical add/drop unit 64 multiplexes the band signal 221 in the L-band signal 220 input from the demultiplexing unit 61 and the band signal 223 input from the demultiplexing unit 62, and outputs the L-band signal 240 to the multiplexing unit 65 (S505).

Further, the L-band optical add/drop unit 64 drops the band signal 222 in the L-band signal 220 input from the demultiplexing unit 61 and outputs the band signal 222 to the multiplexing unit 66 (S506).

The multiplexing unit 65 multiplexes the C-band signal 230 input from the C-band optical add/drop unit 63 and the L-band signal 240 input from the L-band optical add unit, and outputs the WDM signal 202 to the terminal station 2 (S507).

The multiplexing unit 66 multiplexes the band signal 212 input from the C-band optical add/drop unit 63 and the band signal 222 input from the L-band optical add/drop unit 64, and outputs the WDM signal 204 to the terminal station 3 (S508).

Effect

The submarine branching apparatus according to the present example embodiment performs add/drop on each of a C-band signal and an L-band signal. Accordingly, a submarine branching apparatus capable of flexible transmission control on a per-wavelength basis in an optical transmission system using the C-band and the L-band can be provided.

Sixth Example Embodiment

Configuration

A sixth example embodiment of the present invention will be described. A submarine branching apparatus according to the sixth example embodiment of the present invention is configured to be capable of controlling an output destination of a signal in response to occurrence of a failure. Description of a configuration according to the sixth example embodiment of the present invention similar to that according to another example embodiment of the present invention is omitted.

Figure 12:
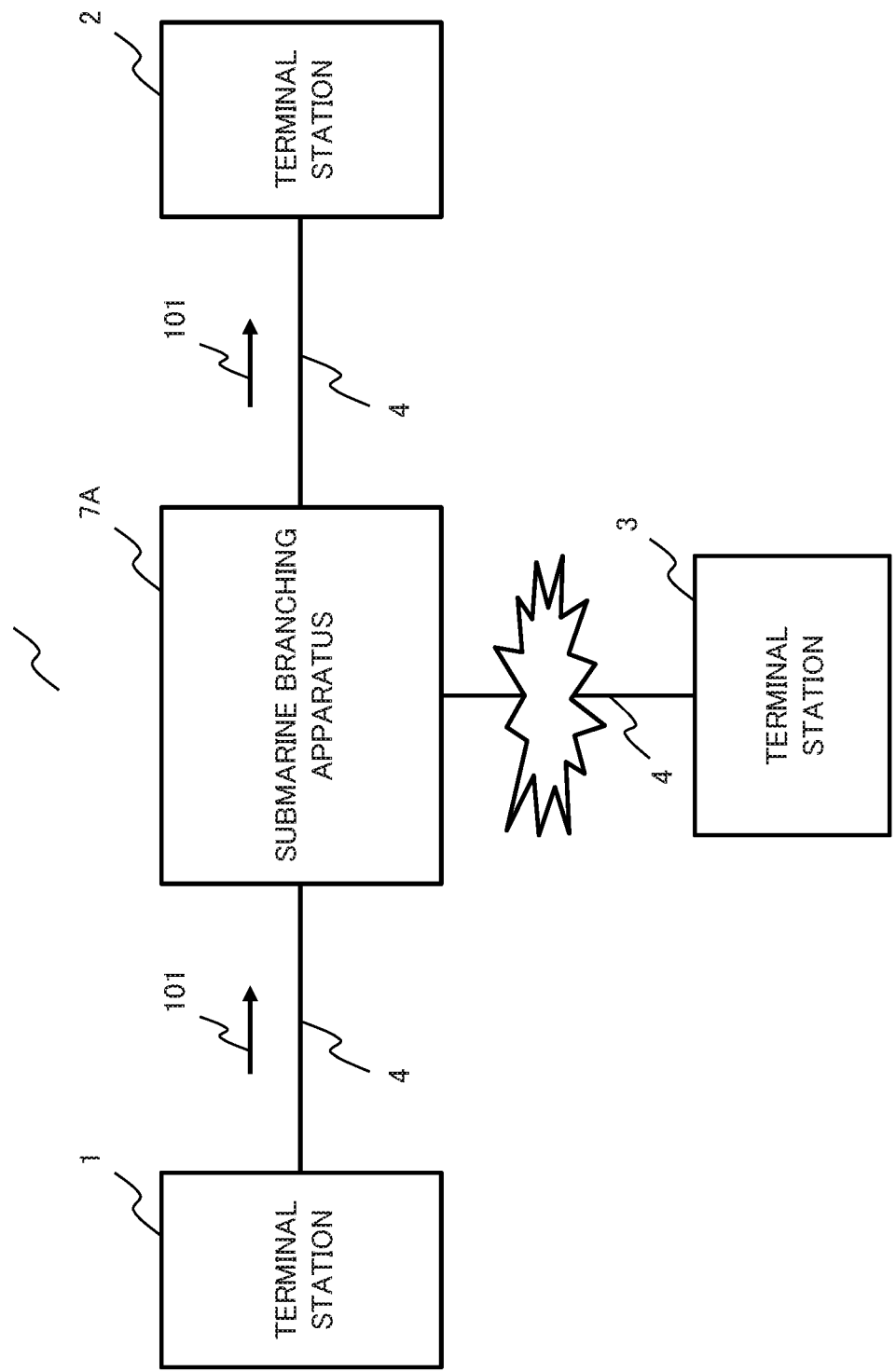
FIG. 12 is a diagram illustrating a configuration example of an optical submarine cable system according to a sixth example embodiment.

FIG. 12 illustrates a configuration example of an optical submarine cable system according to the sixth example embodiment of the present invention. Compared with the configuration illustrated in FIG. 1, the optical submarine cable system 2000 illustrated in FIG. 12 includes a submarine branching apparatus 7A in place of the submarine branching apparatus 5. Further, FIG. 12 illustrates a configuration example when a failure occurs on a transmission line through an optical submarine cable 4 between a terminal station 3 and the submarine branching apparatus 7A. A configuration example under normal operation is similar to the configuration example illustrated in FIG. 1. As illustrated in FIG. 12, the submarine branching apparatus 7A controls an output destination of a WDM signal in response to occurrence of a failure and outputs a WDM signal 101 input from a terminal station 1 to a terminal station 2.

Figure 13:
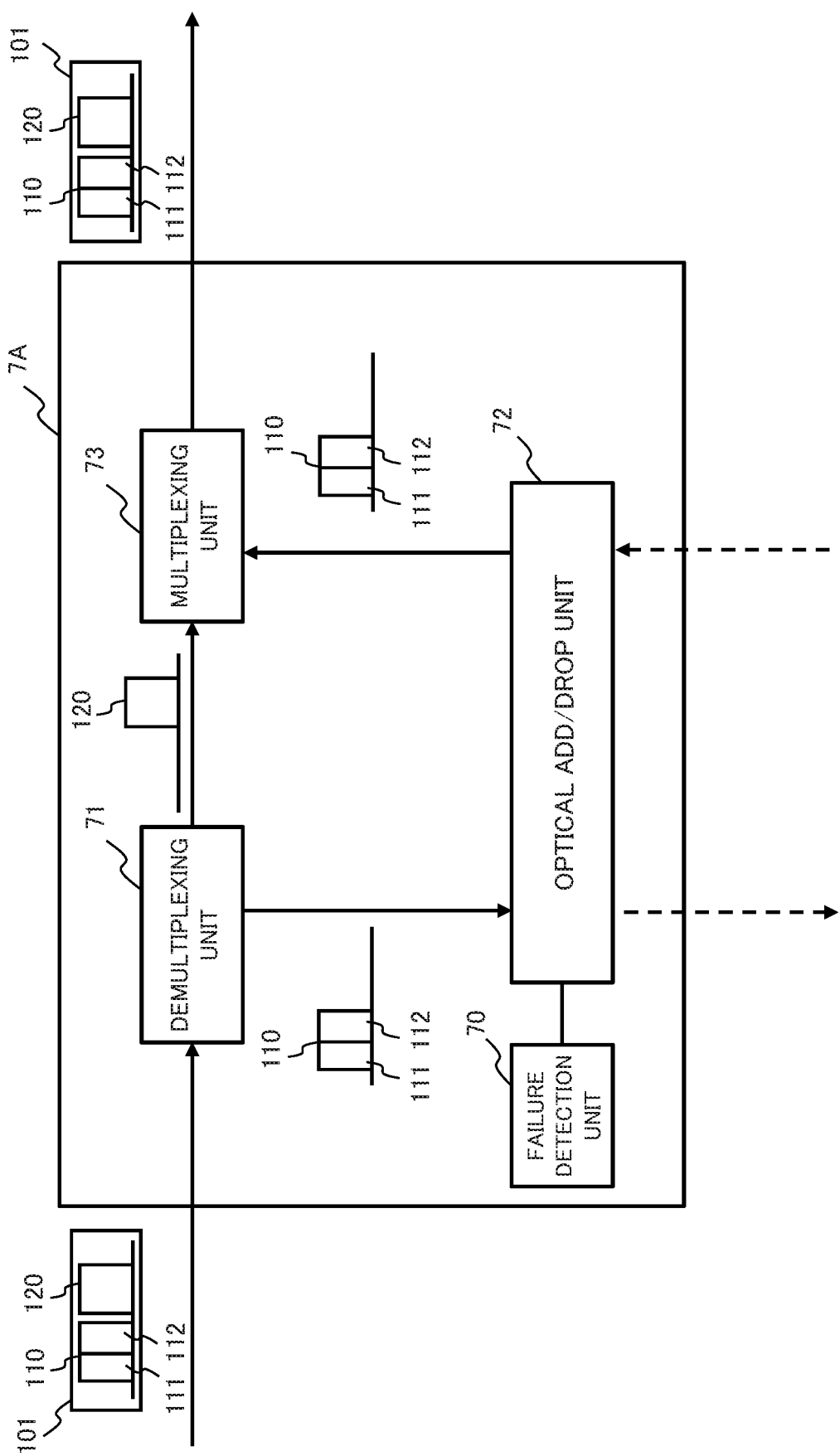
FIG. 13 is a diagram illustrating a configuration example of a submarine branching apparatus according to the sixth example embodiment.

FIG. 13 illustrates a configuration example of the submarine branching apparatus 7A according to the sixth example embodiment of the present invention. The submarine branching apparatus 7A includes a failure detection unit 70, a demultiplexing unit 71, an optical add/drop unit 72, and a multiplexing unit 73. Further, a solid arrow in FIG. 13 indicates a signal flow when a failure occurs on the transmission line through the optical submarine cable 4 between the terminal station 3 and the submarine branching apparatus 7A. A signal flow under normal operation is similar to the configuration example illustrated in FIG. 2. A broken arrow in FIG. 13 indicates a signal flow between the terminal station 3 and the submarine branching apparatus 7A under normal operation.

The demultiplexing unit 71 and the multiplexing unit 73 are similar to the demultiplexing unit 51 and the multiplexing unit 53 in FIG. 2, respectively, and therefore detailed description thereof is omitted.

The failure detection unit 70 detects a failure on the transmission line through the optical submarine cable 4 between the terminal station 3 and the submarine branching apparatus 7A. The failure detection unit 70 may also detect a failure on a transmission line between another terminal station and the submarine branching apparatus. Further, the failure detection unit 70 instructs the optical add/drop unit 72 to change a wavelength band to be multiplexed and demultiplexed in response to detection of a failure. The failure detection unit 70 may monitor a WDM signal input to the submarine branching apparatus 7A and detect a failure on the transmission line in response to signal quality degradation or signal interruption of the monitored WDM signal. Further, the failure detection unit 70 may detect a failure by receiving failure occurrence information from a terminal station or another submarine branching apparatus. An unillustrated monitor unit may detect a failure on the transmission line, in place of the failure detection unit 70. In this case, the failure detection unit 70 gives an instruction to the optical add/drop unit 72 in response to detection of a failure by the monitor unit.

The optical add/drop unit 72 has a function capable of changing a wavelength band to be multiplexed and demultiplexed. In response to occurrence of a failure, the optical add/drop unit 72 changes a wavelength band to be multiplexed and demultiplexed, and switches an output destination of a signal. The optical add/drop unit 72 outputs a C-band signal 110 input from the demultiplexing unit 71 to the multiplexing unit 73.

Operation

Figure 14:
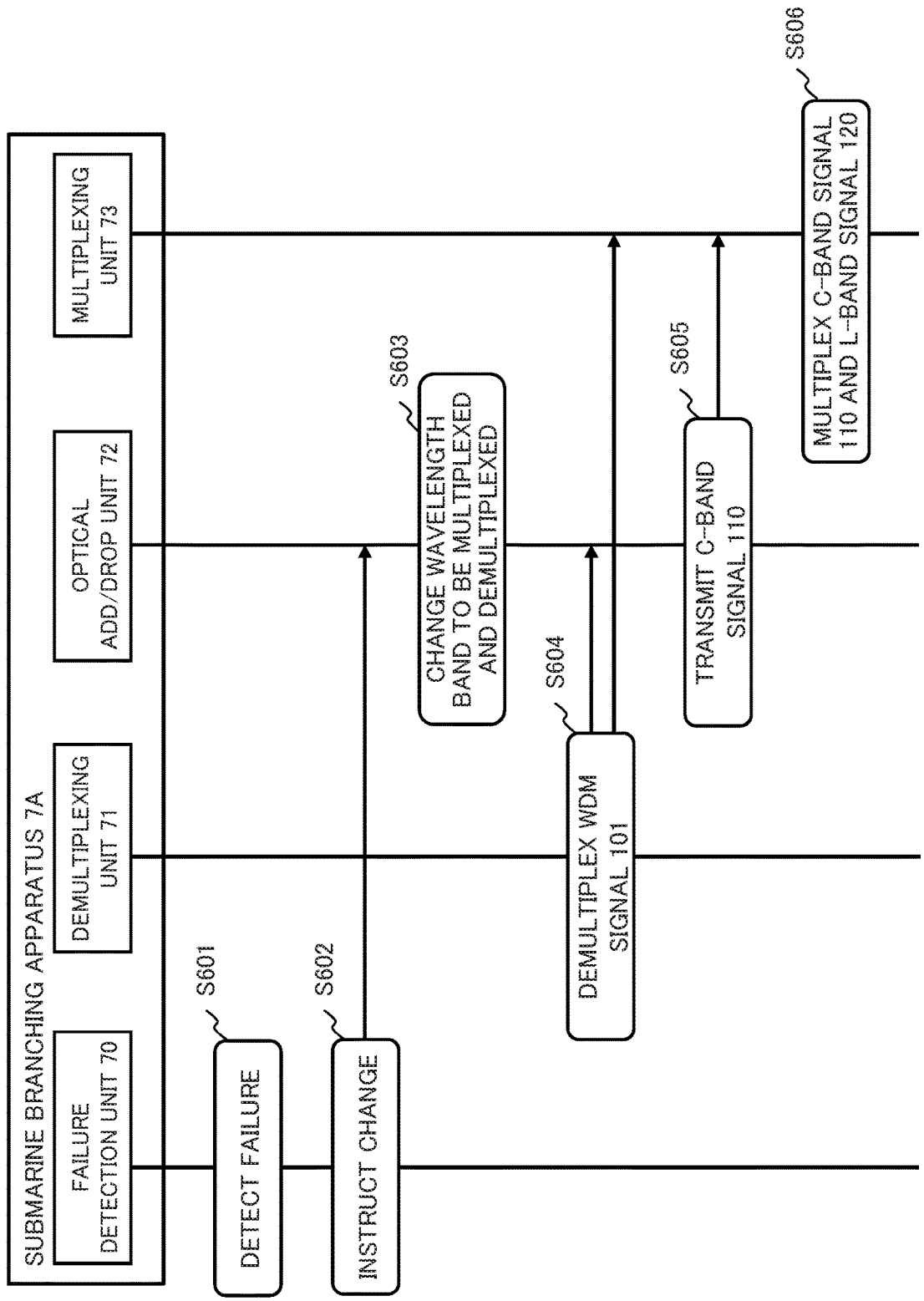
FIG. 14 is a sequence diagram illustrating an operation example of the submarine branching apparatus according to the sixth example embodiment.

An operation example of the submarine branching apparatus 7A according to the sixth example embodiment at occurrence of a failure will be described below by use of FIG. 14. An operation example of the submarine branching apparatus 7A under normal operation is similar to the operation example illustrated in FIG. 3.

The failure detection unit 70 detects a failure on the transmission line through the optical submarine cable 4 between the terminal station 3 and the submarine branching apparatus 7A (S601).

In response to the detection of the failure, the failure detection unit 70 instructs the optical add/drop unit 72 to change a wavelength band to be multiplexed and demultiplexed (S602).

In response to the instruction from the failure detection unit 70, the optical add/drop unit 72 changes a wavelength band to be multiplexed and demultiplexed (S603).

The demultiplexing unit 71 demultiplexes the WDM signal 101 (S604).

The optical add/drop unit 72 transmits a C-band signal 110 input from the demultiplexing unit 71 and outputs the C-band signal 110 to the multiplexing unit 73 (S605).

The multiplexing unit 73 multiplexes the C-band signal 110 and an L-band signal 120, and outputs the WDM signal 101 to the terminal station 2 (S606).

Effect

The submarine branching apparatus according to the present example embodiment is configured to be capable of controlling an output destination of a signal in response to occurrence of a failure. Accordingly, a submarine branching apparatus being capable of providing an optical transmission system using the C-band and the L-band, and also being capable of handling occurrence of a failure can be provided.

Seventh Example Embodiment

Configuration

A seventh example embodiment of the present invention will be described. A submarine branching apparatus according to the seventh example embodiment of the present invention is configured to be capable of controlling an output destination of a signal in response to occurrence of a failure. Further, the submarine branching apparatus is configured to be capable of securing data confidentiality. Description of a configuration according to the seventh example embodiment of the present invention similar to that according to another example embodiment of the present invention is omitted.

Compared with the configuration illustrated in FIG. 12, an optical submarine cable system according to the seventh example embodiment of the present invention includes a submarine branching apparatus 7B in place of the submarine branching apparatus 7A.

The submarine branching apparatus 7A according to the aforementioned sixth example embodiment of the present invention outputs the WDM signal 101 including the band signal 112 to the terminal station 2. Data to be received by the terminal station 3 may be superposed on the band signal 112 but, in this case, the band signal 112 is output to the terminal station 2 not being an original destination.

Then, the submarine branching apparatus 7B according to the seventh example embodiment of the present invention performs predetermined waveform processing on a band signal on which data to be received by the terminal station 3 are superposed. By doing so, even when a signal is output to a terminal station not being an original destination, data confidentiality can be secured.

Figure 15:
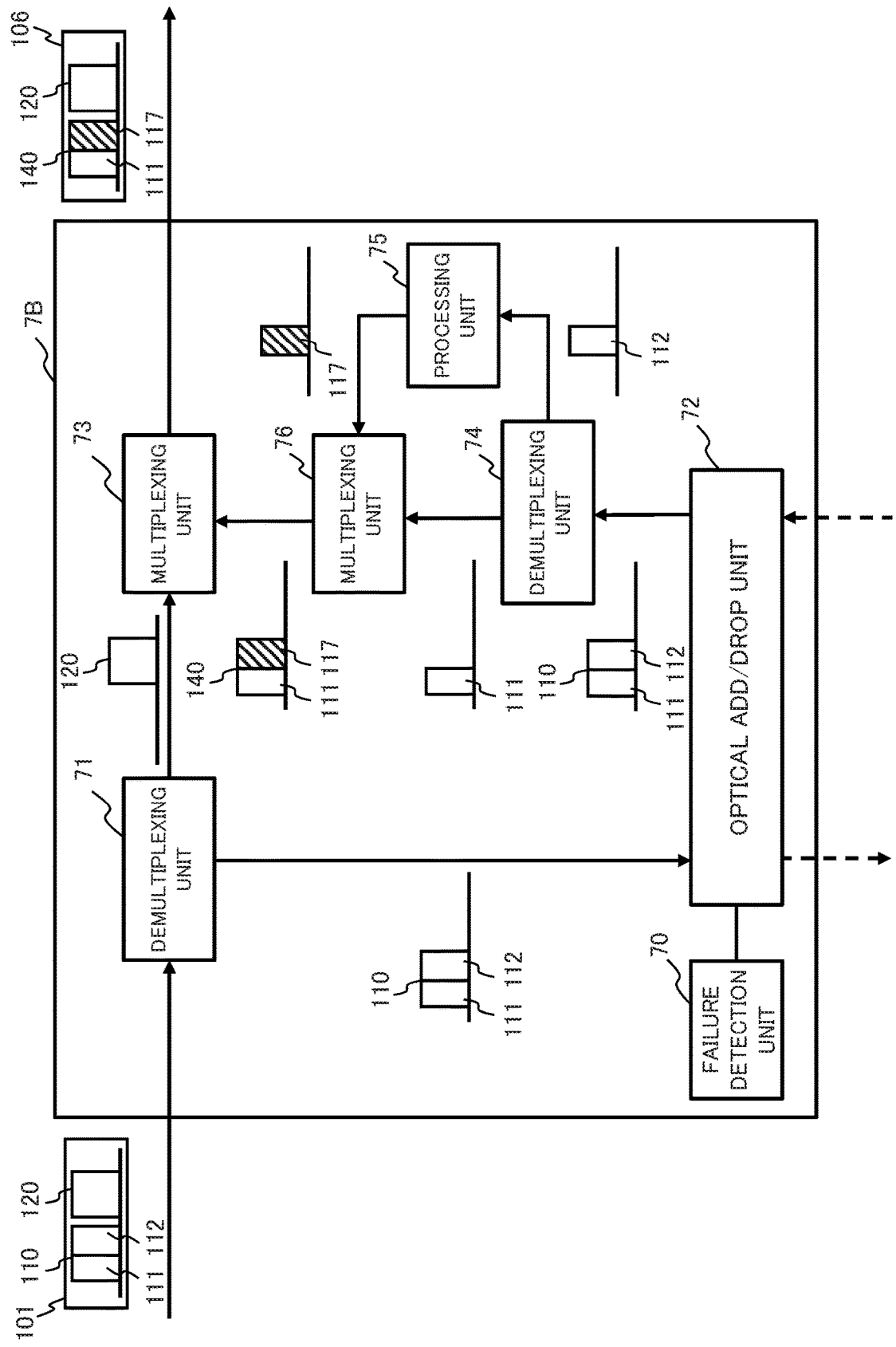
FIG. 15 is a diagram illustrating a configuration example of a submarine branching apparatus according to a seventh example embodiment.

FIG. 15 illustrates a configuration example of the submarine branching apparatus 7B according to the seventh example embodiment. In addition to the configuration of the submarine branching apparatus 7A in FIG. 13, the submarine branching apparatus 7B in FIG. 15 includes a demultiplexing unit 74, a processing unit 75, and a multiplexing unit 76. Further, a solid arrow in FIG. 15 indicates a signal flow when a failure occurs on a transmission line through an optical submarine cable 4 between the terminal station 3 and the submarine branching apparatus 7B. A signal flow under normal operation is similar to the configuration example illustrated in FIG. 2. A broken arrow in FIG. 15 indicates a signal flow between the terminal station 3 and the submarine branching apparatus 7B under normal operation.

The demultiplexing unit 74 demultiplexes a C-band signal 110 input from an optical add/drop unit 72 into a band signal 111 and a band signal 112. For example, the demultiplexing unit 74 may be a WSS selectively switching a wavelength output to a specific port, an optical filter selectively transmitting or reflecting a specific wavelength, or a combination of an optical coupler and an optical filter selectively transmitting a specific wavelength. Further, a wavelength band demultiplexed by the demultiplexing unit 74 may be changeable. A change of a wavelength band may be performed based on control from an unillustrated control device or may be performed in response to detection of a failure by a failure detection unit 70.

The processing unit 75 generates a processed signal 117 by applying the predetermined waveform processing on the band signal 112 input from the demultiplexing unit 74. The processing unit 75 outputs the processed signal 117 to the multiplexing unit 76. The processing unit 75 may add a predetermined pattern to the band signal 112 as the predetermined waveform processing. For example, the predetermined pattern may be a dummy pattern randomly arranging 0 and 1, or a fixed pattern arranging 0 and 1 in a specific pattern. Further, the processing unit 75 may perform scrambling processing on the band signal 112 as the predetermined waveform processing. Further, the processing unit 75 may degrade a transmission characteristic of the band signal 112 as the predetermined waveform processing. Furthermore, the processing unit 75 may delay the band signal 112 and cause the multiplexing unit 76 to multiplex the delayed signal as a delayed optical signal. The predetermined waveform processing executed by the processing unit 75 may be changeable. A change of the waveform processing may be performed based on control from an unillustrated control device or may be performed in response to detection of a failure by the failure detection unit 70.

The multiplexing unit 76 multiplexes the band signal 111 and the processed signal 117, and outputs the multiplexed signal to the multiplexing unit 73. The multiplexing unit 76 may be an optical coupler.

Operation

Operations of the demultiplexing unit 74, the processing unit 75, and the multiplexing unit 76, according to the seventh example embodiment, are similar to the operation example illustrated in FIG. 7. In this case, the demultiplexing unit 74, the processing unit 75, and the multiplexing unit 76 correspond to the demultiplexing unit 524, the processing unit 525, and the multiplexing unit 526, respectively.

Effect

The optical add/drop unit according to the present example embodiment is configured to apply predetermined waveform processing to a signal on which data output to a terminal station not being an original destination are superposed, when changing an output destination of a signal in response to occurrence of a failure. Consequently, the data cannot be extracted from the signal on which the waveform processing is applied, at the terminal station not being the original destination. Accordingly, an effect of allowing secured data confidentiality while achieving flexible signal transmission control is provided.

Eighth Example Embodiment

An eighth example embodiment of the present invention will be described. A submarine branching apparatus according to the eighth example embodiment of the present invention is configured to be capable of controlling an output destination of a signal in response to occurrence of a failure. Description of a configuration according to the eighth example embodiment of the present invention similar to that according to another example embodiment of the present invention is omitted.

Figure 16:
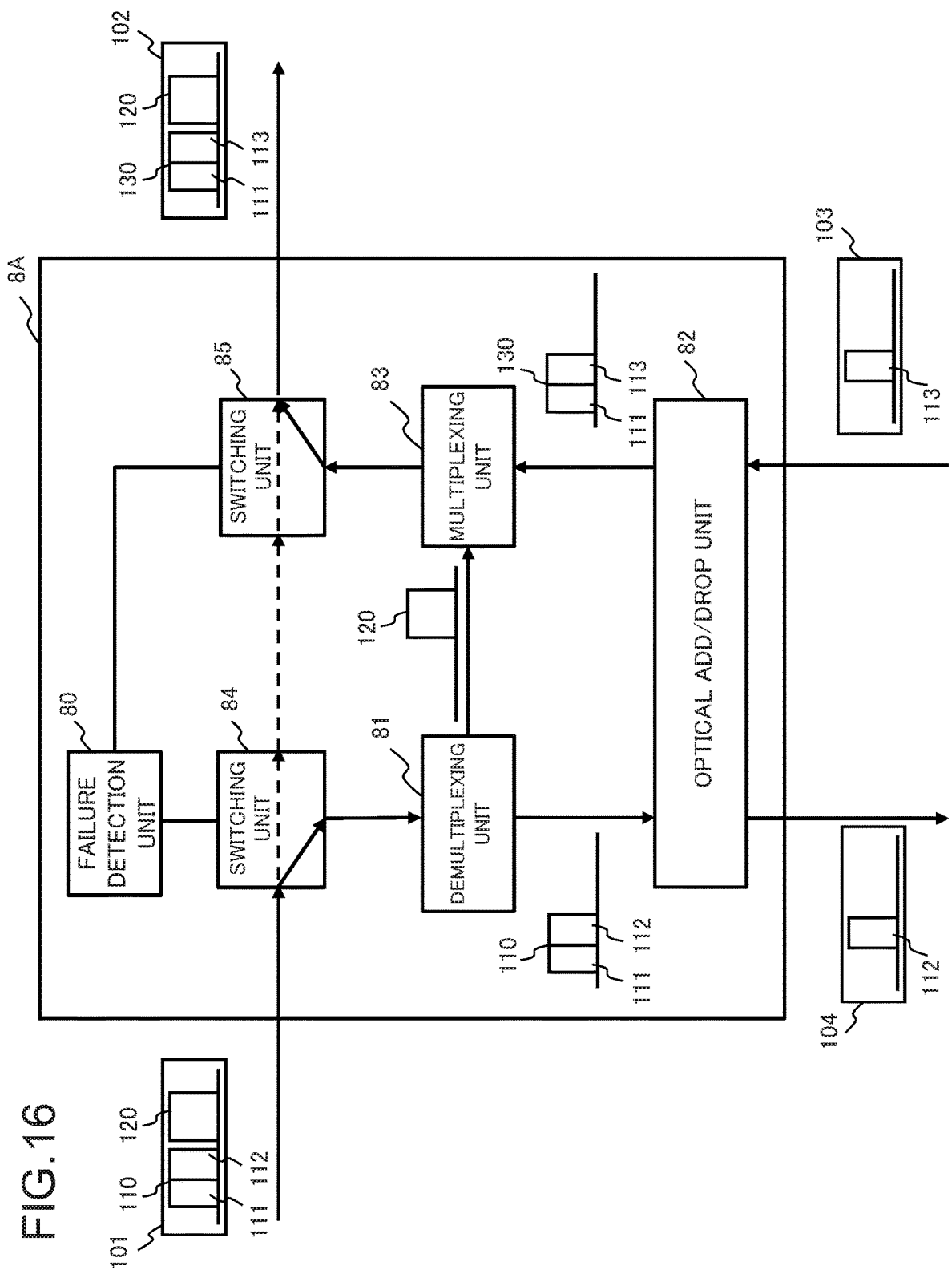
FIG. 16 is a diagram illustrating a configuration example of a submarine branching apparatus according to an eighth example embodiment.

Compared with the configuration illustrated in FIG. 12, an optical submarine cable system according to the eighth example embodiment of the present invention includes a submarine branching apparatus 8A in place of the submarine branching apparatus 7A. FIG. 16 illustrates a configuration example of the submarine branching apparatus 8A according to the eighth example embodiment of the present invention. In addition to the configuration illustrated in FIG. 2, the submarine branching apparatus 8A includes a failure detection unit 80, a demultiplexing unit 81, an optical add/drop unit 82, a multiplexing unit 83, and switching units 84 and 85. Further, a solid arrow in FIG. 16 indicates a signal flow under normal operation.

The demultiplexing unit 81, the optical add/drop unit 82, and the multiplexing unit 83 are similar to the demultiplexing unit 51, the optical add/drop unit 52, and the multiplexing unit 53 in FIG. 2, respectively, and therefore detailed description thereof is omitted. The optical add/drop unit 82 may also be similar to the optical add/drop unit 72 in FIG. 13.

The failure detection unit 80 detects a failure on a transmission line through an optical submarine cable 4 between a terminal station 3 and the submarine branching apparatus 8A. The failure detection unit 80 may also detect a failure on a transmission line between another terminal station and the submarine branching apparatus 8A. Further, a switching control unit instructs the switching units 84 and 85 to switch signal paths in response to detection of a failure. The failure detection unit 80 may monitor a WDM signal input to the submarine branching apparatus 8A and detect a failure on the transmission line in response to signal quality degradation or signal interruption of the monitored WDM signal. Further, the failure detection unit 80 may detect a failure by receiving failure occurrence information from a terminal station or another submarine branching apparatus. An unillustrated monitor unit may detect a failure on the transmission line, in place of the failure detection unit 80. In this case, the failure detection unit 80 gives an instruction to the switching units 84 and 85 in response to detection of a failure by the monitor unit.

The switching unit 84 outputs a WDM signal 101 input from a terminal station 1 to the demultiplexing unit 81. Further, the switching unit 85 outputs a WDM signal 102 input from the multiplexing unit 83 to a terminal station 2.

Figure 17:
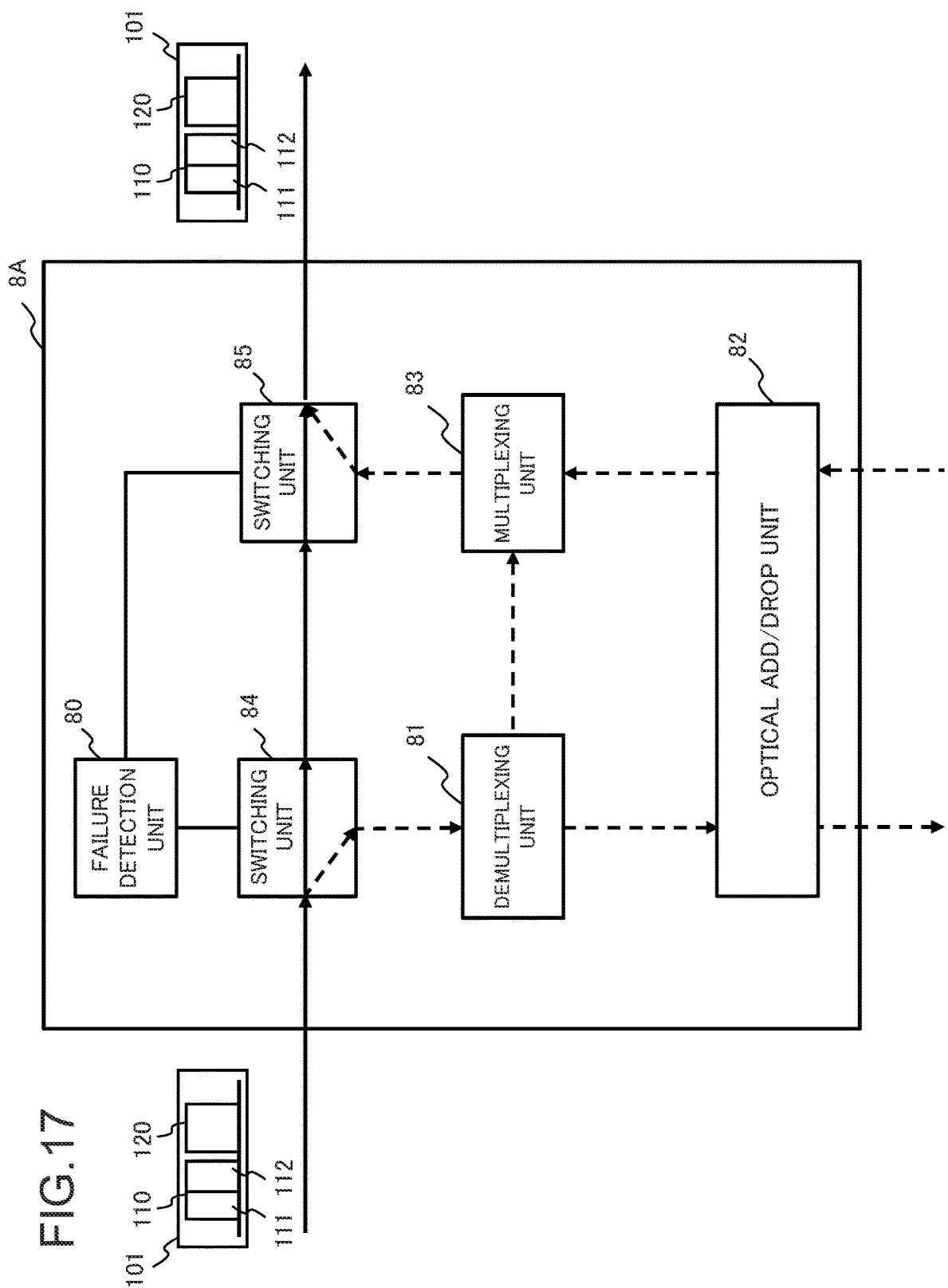
FIG. 17 is a diagram illustrating a configuration example of the submarine branching apparatus according to the eighth example embodiment.

The switching units 84 and 85 switch signal paths, based on an instruction from the failure detection unit 80. FIG. 17 illustrates a configuration example of the submarine branching apparatus 8A when the switching units 84 and 85 switch the signal paths. A solid arrow in FIG. 17 indicates a signal flow when the switching units 84 and 85 switch the signal paths. The switching unit 84 switches the signal path and outputs the WDM signal 101 input from the terminal station 1 to the switching unit 85. Further, the switching unit 85 switches the signal path and outputs the WDM signal 101 input from the switching unit 84 to the terminal station 2.

Operation

Figure 18:
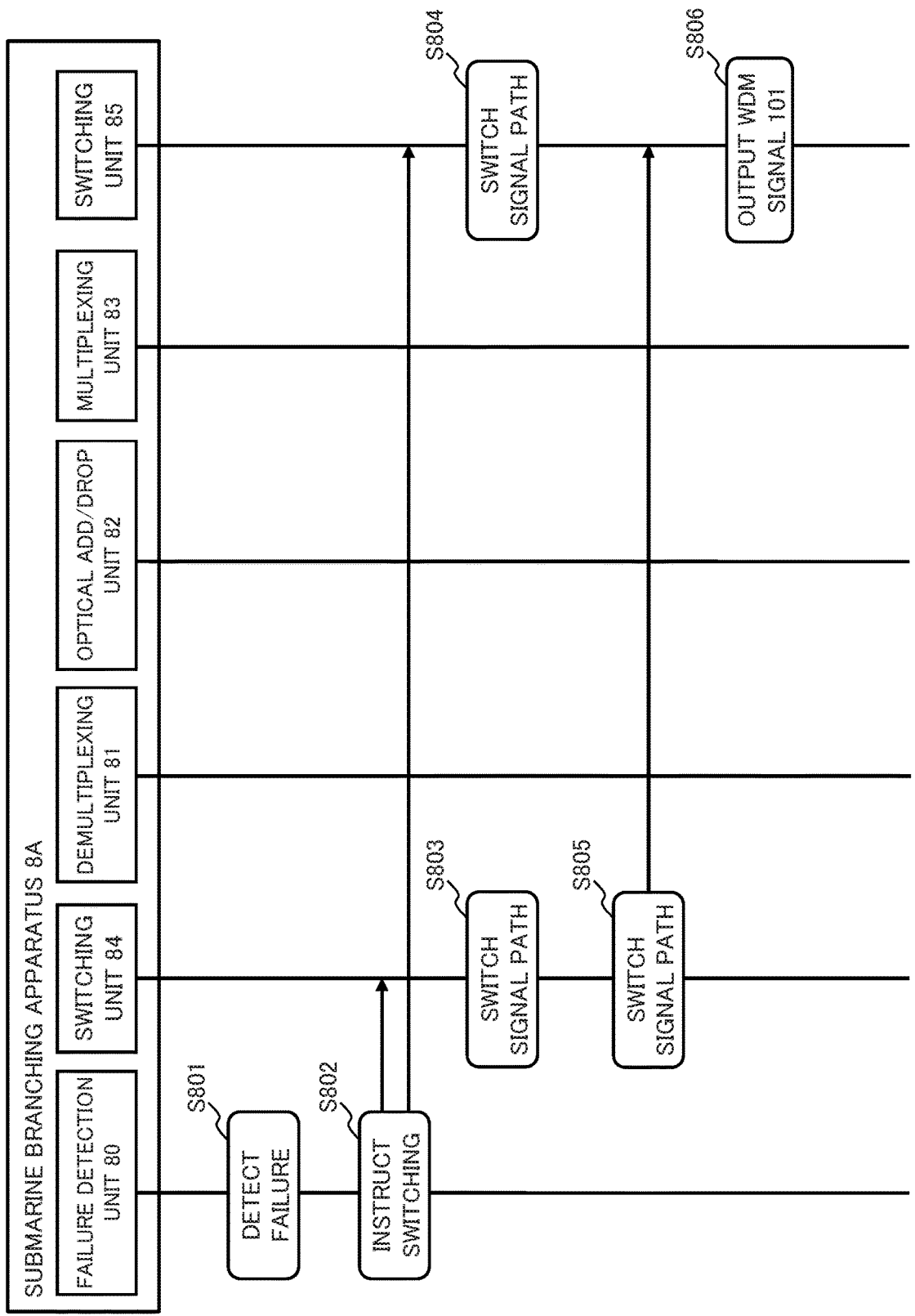
FIG. 18 is a sequence diagram illustrating an operation example of the submarine branching apparatus according to the eighth example embodiment.

An operation example of the submarine branching apparatus 8A according to the present example embodiment will be described by use of FIG. 18. An operation example of the submarine branching apparatus 8A under normal operation is similar to the operation example in FIG. 3.

The failure detection unit 80 detects a failure on the transmission line through the optical submarine cable 4 between the terminal station 3 and the submarine branching apparatus 8A (S801).

In response to the detection of the failure, the failure detection unit 80 instructs the switching units 84 and 85 to switch the signal paths (S802).

The switching unit 84 switches the signal path (S803).

The switching unit 85 switches the signal path (S804). An execution order of S803 and S804 is not limited. For example, S803 may be executed after S804 is executed, or S803 and S804 may be executed simultaneously.

The switching unit 84 outputs the WDM signal 101 input from the terminal station 1 to the switching unit 85 (S805).

The switching unit 85 outputs the WDM signal 101 input from the switching unit 84 to the terminal station 2 (S806).

Effect

The submarine branching apparatus according to the present example embodiment is configured to be capable of controlling an output destination of a signal in response to occurrence of a failure. Accordingly, a submarine branching apparatus being capable of providing an optical transmission system using the C-band and the L-band, and also being capable of handling occurrence of a failure can be provided.

Ninth Example Embodiment

Configuration

A ninth example embodiment of the present invention will be described. A submarine branching apparatus according to the ninth example embodiment of the present invention is configured to be capable of controlling an output destination of a signal in response to occurrence of a failure. Further, the submarine branching apparatus is configured to be capable of securing data confidentiality. Description of a configuration according to the ninth example embodiment of the present invention similar to that according to another example embodiment of the present invention is omitted.

Compared with the configuration illustrated in FIG. 12, an optical submarine cable system according to the ninth example embodiment of the present invention includes a submarine branching apparatus 8B in place of the submarine branching apparatus 7A.

The submarine branching apparatus 8A according to the aforementioned eighth example embodiment of the present invention outputs the WDM signal 101 including the band signal 112 to the terminal station 2. Data to be received by the terminal station 3 may be superposed on the band signal 112 but, in this case, the band signal 112 is output to the terminal station 2 not being an original destination.

Then, the submarine branching apparatus 8B according to the ninth example embodiment of the present invention performs predetermined waveform processing on a band signal on which data to be received by the terminal station 3 are superposed. By doing so, even when a signal is output to a terminal station not being an original destination, data confidentiality can be secured.

Figure 19:
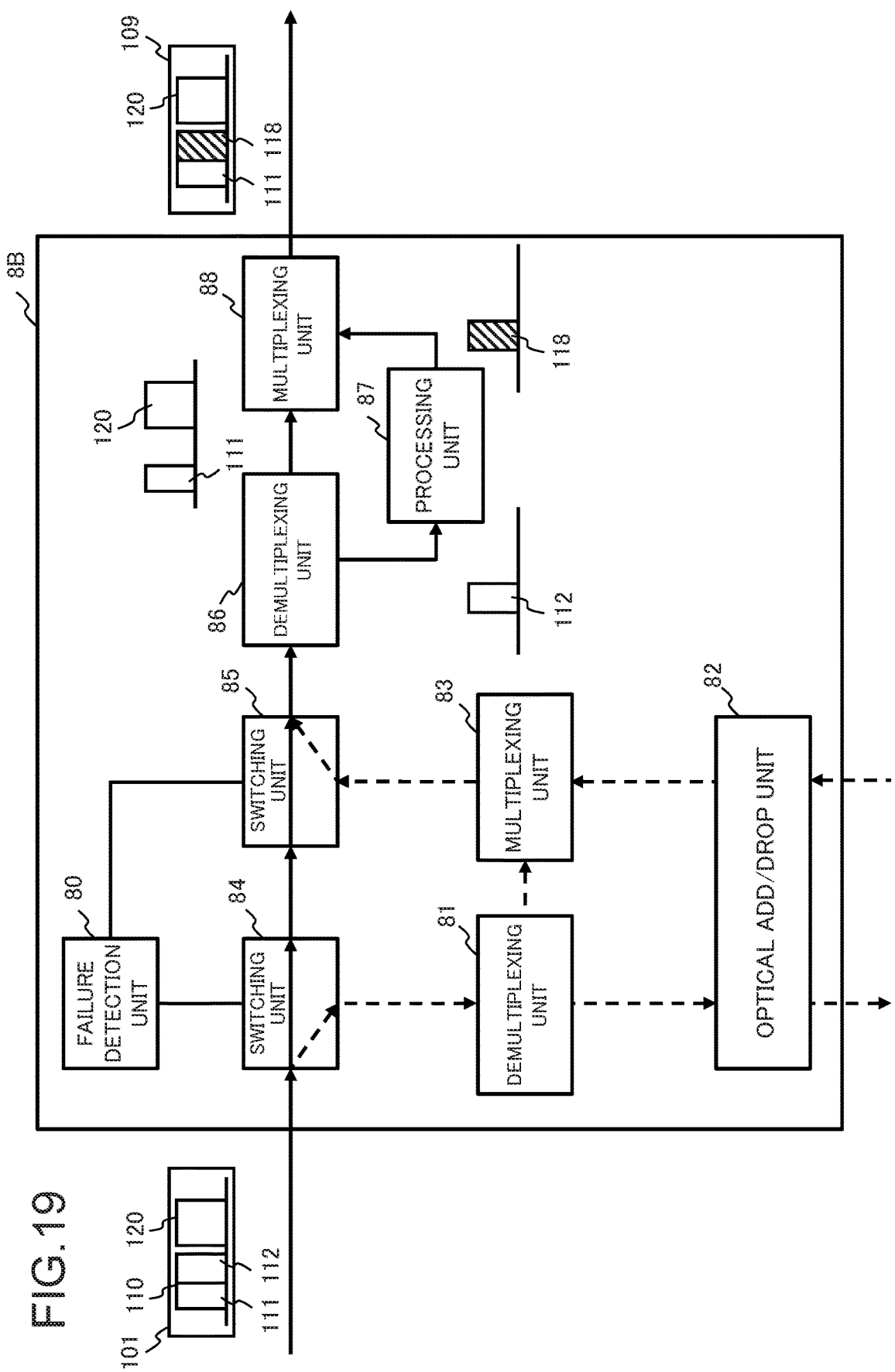
FIG. 19 is a diagram illustrating a configuration example of a submarine branching apparatus according to a ninth example embodiment.

FIG. 19 illustrates a configuration example of the submarine branching apparatus 8B according to the ninth example embodiment. In addition to the configuration of the submarine branching apparatus 8A in FIG. 16, the submarine branching apparatus 8B in FIG. 19 includes a demultiplexing unit 86, a processing unit 87, and a multiplexing unit 88. A solid arrow in FIG. 19 indicates a signal flow when switching units 84 and 85 switch signal paths, and a broken arrow indicates a signal flow before the switching units 84 and 85 switch the signal paths.

The demultiplexing unit 86 demultiplexes a WDM signal 101 input from the switching unit 85. The demultiplexing unit 86 outputs a band signal 112 to the processing unit 87 and outputs a band signal 111 and an L-band signal 120 to the multiplexing unit 88. For example, the demultiplexing unit 86 may be a WSS selectively switching a wavelength output to a specific port, an optical filter selectively transmitting or reflecting a specific wavelength, or a combination of an optical coupler and an optical filter selectively transmitting a specific wavelength. Further, a wavelength band demultiplexed by the demultiplexing unit 86 may be changeable. A change of a wavelength band may be performed based on control from an unillustrated control device.

The processing unit 87 generates a processed signal 118 by applying predetermined waveform processing to the band signal 112 input from the demultiplexing unit 86. The processing unit 87 outputs the processed signal 118 to the multiplexing unit 88. The processing unit 87 may add a predetermined pattern to the band signal 112 as the predetermined waveform processing. For example, the predetermined pattern may be a dummy pattern randomly arranging 0 and 1, or a fixed pattern arranging 0 and 1 in a specific pattern. Further, the processing unit 87 may perform scrambling processing on the band signal 112 as the predetermined waveform processing. Furthermore, the processing unit 87 may delay the band signal 112 and cause the multiplexing unit 88 to multiplex the delayed signal as a delayed optical signal. Further, the processing unit 87 may degrade a transmission characteristic of the band signal 112 as the predetermined waveform processing. The predetermined waveform processing executed by the processing unit 87 may be changeable. A change of a waveform processing may be performed based on control from an unillustrated control device or may be performed in response to detection of a failure by a failure detection unit 80.

The multiplexing unit 88 multiplexes the band signal 111 and the L-band signal 120 that are input from the demultiplexing unit 86, and the processed signal 118 input from the processing unit 87, and outputs a WDM signal 109 to the terminal station 2. The multiplexing unit 88 may be an optical coupler.

Operation

Operations of the demultiplexing unit 86, the processing unit 87, and the multiplexing unit 88, according to the present example embodiment, are similar to the operation example illustrated in FIG. 7. In this case, the demultiplexing unit 86, the processing unit 87, and the multiplexing unit 88 correspond to the demultiplexing unit 524, the processing unit 525, and the multiplexing unit 526, respectively.

Effect

The optical add/drop unit according to the present example embodiment is configured to apply predetermined waveform processing to a signal on which data output to a terminal station not being an original destination are superposed, when changing an output destination of a signal in response to occurrence of a failure. Consequently, the data cannot be extracted from the signal to which the waveform processing is applied, at the terminal station not being the original destination. Accordingly, an effect of allowing secured data confidentiality while achieving flexible signal transmission control is provided.

Tenth Example Embodiment

Configuration

A tenth example embodiment of the present invention will be described. A submarine branching apparatus according to the tenth example embodiment of the present invention is configured to be capable of controlling a configuration in the submarine branching apparatus in response to a control signal input from a terminal station.

Figure 20:
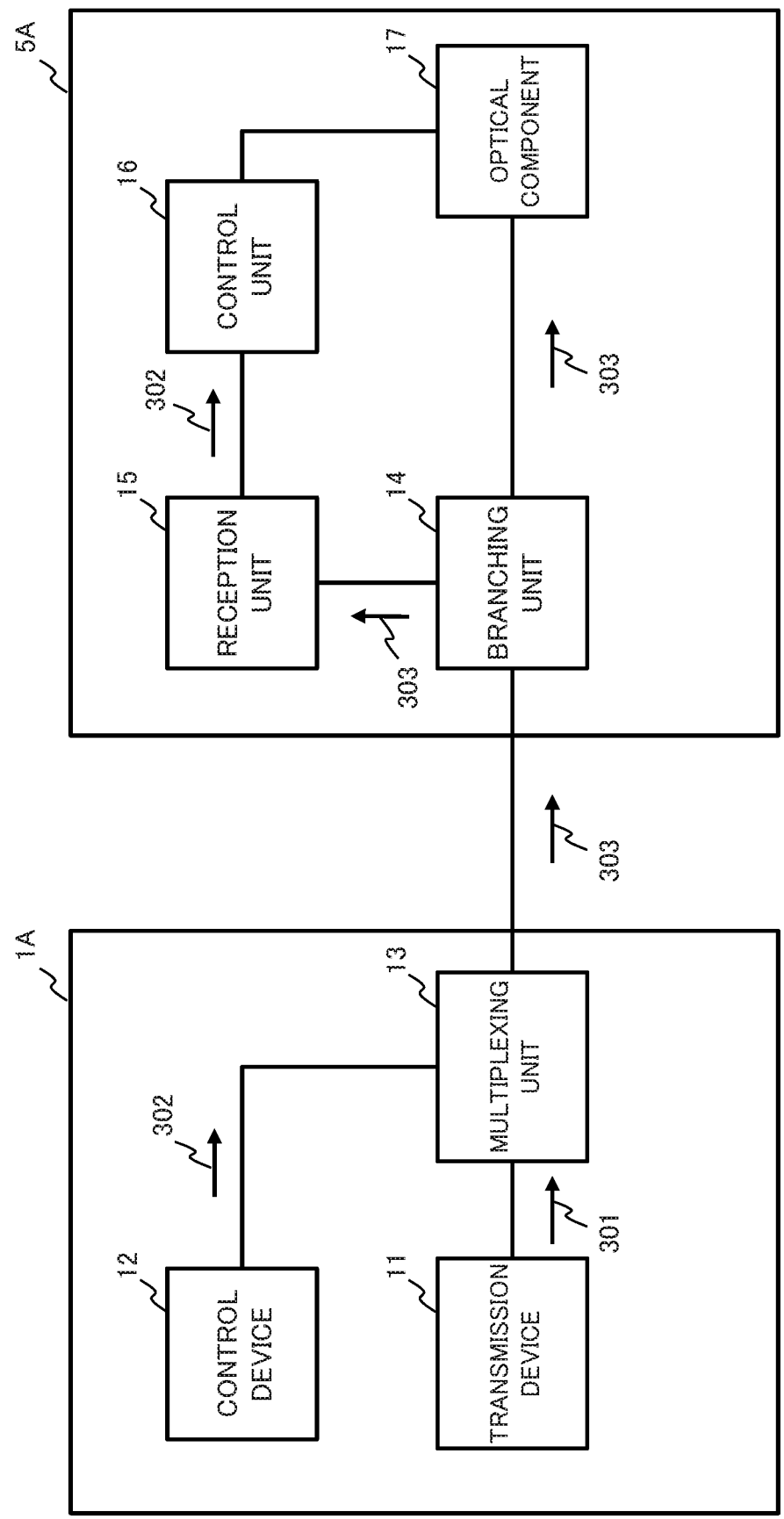
FIG. 20 is a diagram illustrating a configuration example of an optical submarine cable system according to a tenth example embodiment.

FIG. 20 illustrates a configuration example of an optical submarine cable system 3000 according to the tenth example embodiment. The optical submarine cable system 3000 includes a terminal station 1A and a submarine branching apparatus 5A. The optical submarine cable system 3000 may include a plurality of other terminal stations, similarly to the configuration illustrated in FIG. 1.

The terminal station 1A includes a transmission device 11, a control device 12, and a multiplexing unit 13.

The transmission device 11 generates a main signal 301 transmitted to a facing terminal station. The transmission device outputs the main signal 301 to the multiplexing unit 13. For example, the transmission device 11 generates the main signal 301 with a light source and a modulator. Further, the terminal station 1A may include a plurality of transmission devices equivalent to the transmission device 11.

The control device 12 generates a control signal 302 targeted at the submarine branching apparatus 5A. The control device 12 outputs the control signal 302 to the multiplexing unit 13. For example, the control device 12 may generate the control signal 302 by modulating light at a wavelength not included in the main signal 301.

The multiplexing unit 13 generates a WDM signal 303 from the main signal 301 and the control signal 302. The multiplexing unit 13 may include a modulator and modulate the main signal 301, based on the control signal 302. Further, the multiplexing unit 13 may modulate a specific wavelength band, based on the control signal 302, or may modulate the entire main signal 301. When the multiplexing unit 13 modulates the entire main signal 301, for example, the modulation may be performed with a sufficiently low-frequency component compared with the main signal.

The transmission device 11 may be configured to include the control device 12 and the multiplexing unit 13.

The submarine branching apparatus 5A includes a branching unit 14, a reception unit 15, a control unit 16, and an optical component 17. Although not illustrated, the submarine branching apparatus 5A may include a configuration included in a submarine branching apparatus according to other example embodiments.

The branching unit 14 splits the WDM signal 303 input from the terminal station 1A and outputs the split signals to the reception unit 15 and the optical component 17. For example, the branching unit 14 may be an optical coupler.

Figure 21:
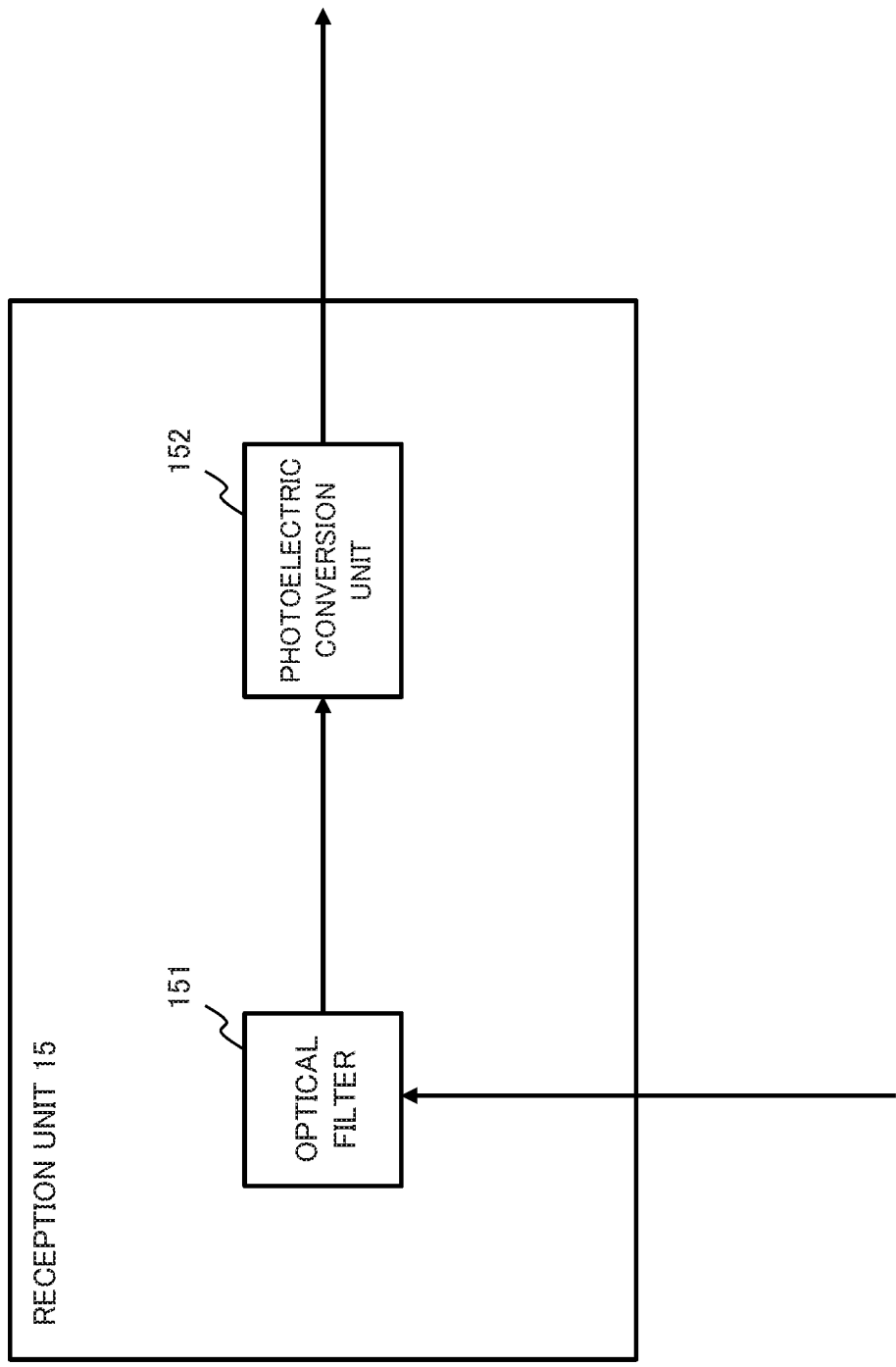
FIG. 21 is a diagram illustrating a configuration example of a reception unit according to the tenth example embodiment.
Figure 22:
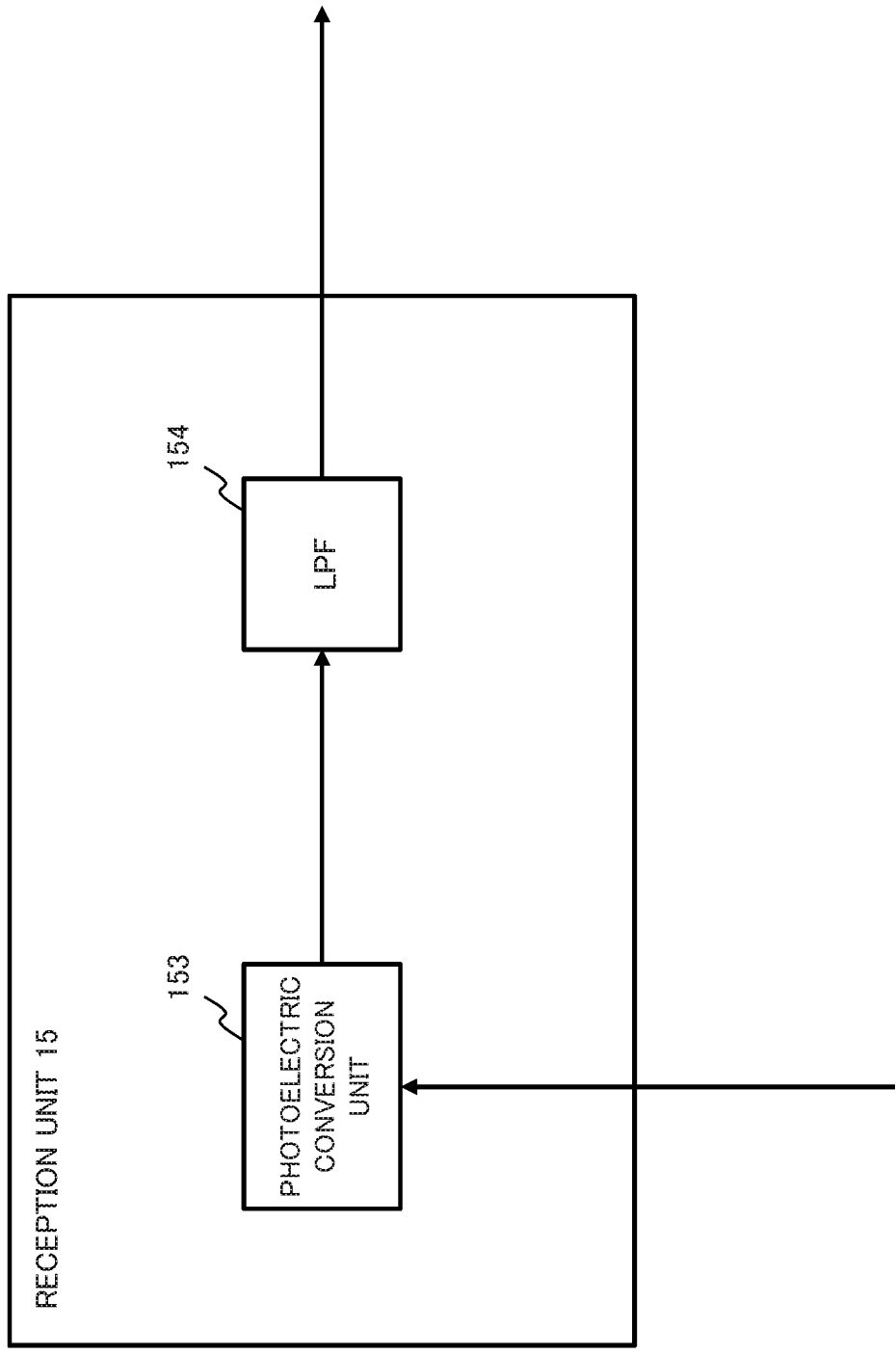
FIG. 22 is a diagram illustrating a configuration example of the reception unit according to the tenth example embodiment.

The reception unit 15 extracts the control signal 302 from the WDM signal 303. Further, the reception unit 15 outputs the control signal 302 to the control unit 16. FIG. 21 illustrates a configuration example of the reception unit 15 according to the tenth example embodiment. When the control signal 302 is generated by modulation of light whose wavelength is not included in the main signal 301 as described above, the reception unit 15 may include an optical filter 151 and a photoelectric conversion unit 152, as illustrated in FIG. 21. The optical filter 151 extracts a wavelength band of the control signal 302 from the WDM signal 303. The photoelectric conversion unit 152 converts the extracted control signal 302 into an electric signal and outputs the converted signal to the control unit 16. Further, FIG. 22 illustrates another configuration example of the reception unit 15 according to the tenth example embodiment. When the control signal 302 is generated by modulation of the entire wavelength band of the main signal 301 as described above, the reception unit 15 may include a photoelectric conversion unit 153 and a low-pass filter (LPF) 154, as illustrated in FIG. 22. The photoelectric conversion unit 153 converts the WDM signal 303 into an electric signal. The LPF 154 extracts a low-frequency modulation component in the converted electric signal and outputs the control signal 302.

In FIG. 20, the control unit 16 executes control over the optical component 17, based on the control signal 302 input from the reception unit 15.

Figure 23:
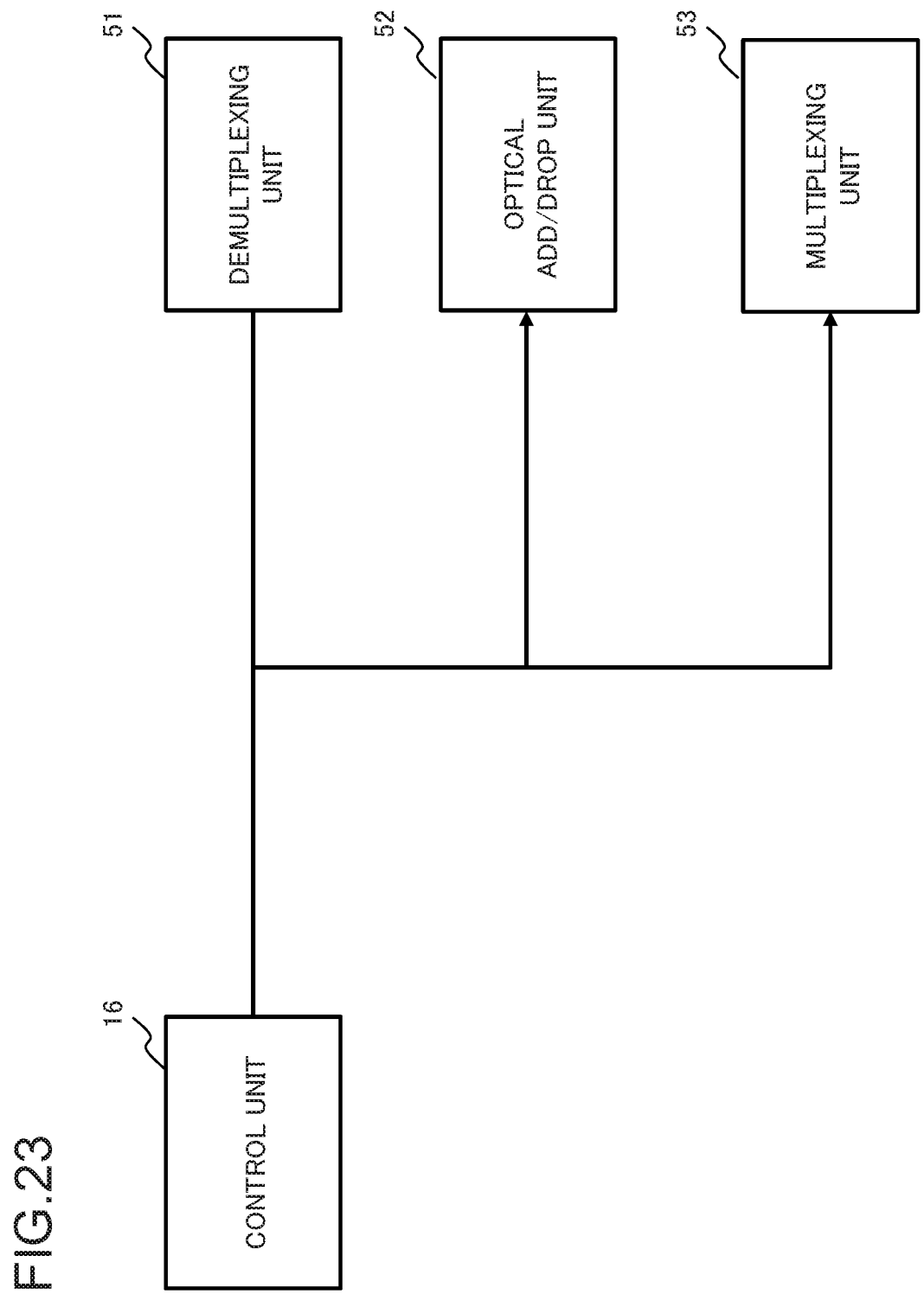
FIG. 23 is a diagram illustrating configuration examples of a control unit and an optical component, according to the tenth example embodiment.

The WDM signal 303 is input to the optical component 17 from the branching unit 14. Further, the optical component 17 is an optical component controllable by an instruction from the control unit 16. For example, as illustrated in FIG. 23, optical components 17 being a control target of the control unit 16 may include a demultiplexing unit 51, an optical add/drop unit 52, and a multiplexing unit 53. Without being limited to the above, the optical component 17 may be a configuration defined to be changeable from a control device, according to another example embodiment.

Operation

Figure 24:
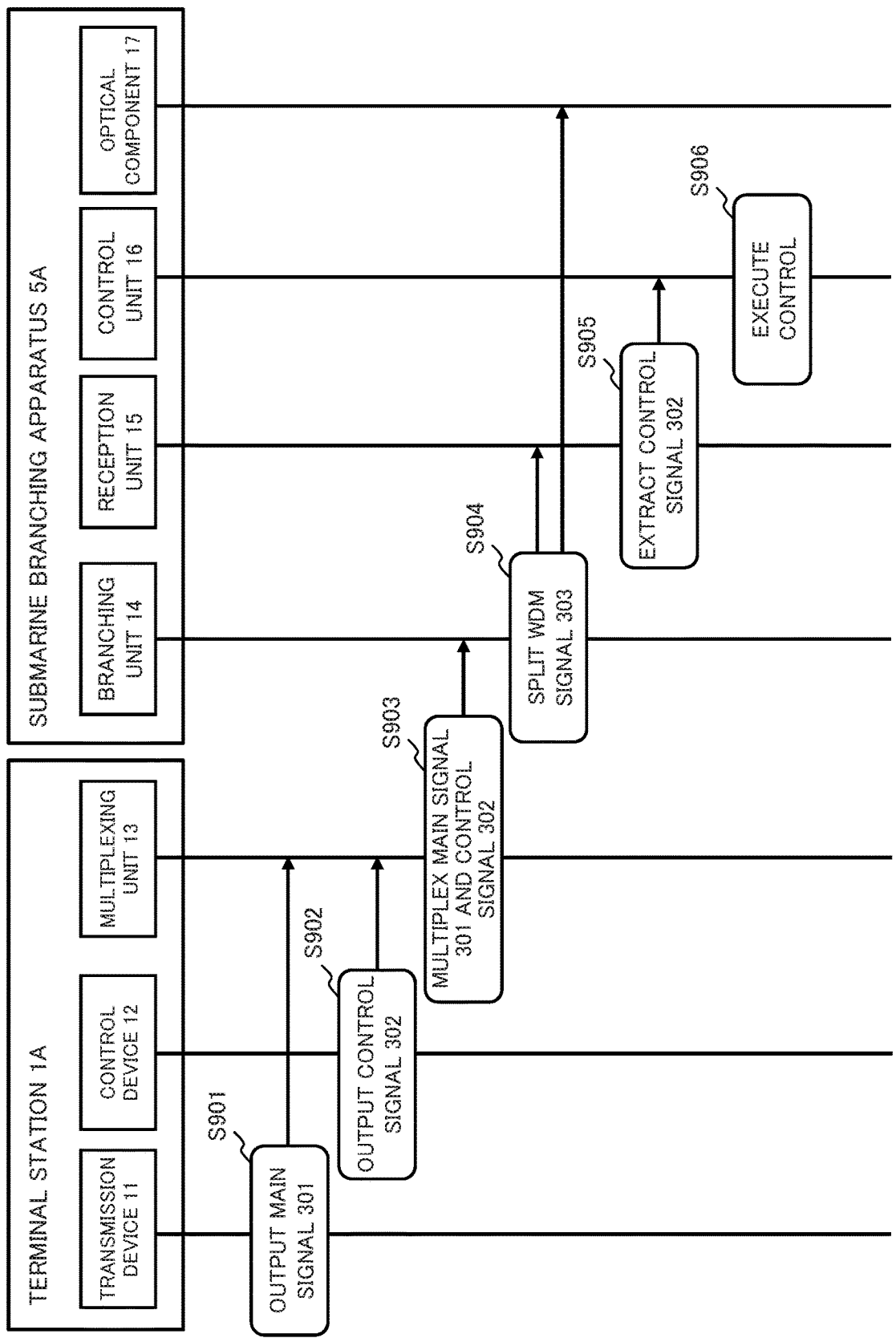
FIG. 24 is a sequence diagram illustrating an operation example of a submarine branching apparatus according to the tenth example embodiment.

An operation example according to the present example embodiment will be described by use of FIG. 24.

The transmission device 11 outputs the main signal 301 to the multiplexing unit 13 (S901).

The control device 12 outputs the control signal 302 to the multiplexing unit 13 (S902). An execution order of S901 and S902 is not limited. For example, S901 may be executed after S902 is executed, or S901 and S902 may be executed simultaneously.

The multiplexing unit 13 generates the WDM signal 303 from the main signal 301 input from the transmission device 11 and the control signal 302 input from the control device 12 (S903).

The branching unit 14 splits the WDM signal 303 input from the terminal station 1A and outputs the split signals to the reception unit 15 and the optical component 17 (S904).

The reception unit 15 extracts the control signal 302 from the WDM signal 303 input from the branching unit 14 and outputs the extracted signal to the control unit 16 (S905).

The control unit 16 executes control over the optical component 17, based on the control signal 302 input from the reception unit 15 (S906).

Effect

The submarine branching apparatus according to the tenth example embodiment of the present invention is configured to be capable of controlling a configuration in the submarine branching apparatus in response to a control signal input from a terminal station. Consequently, an output destination of a WDM signal can be flexibly controlled on a per-wavelength basis. Accordingly, a submarine branching apparatus capable of providing an optical transmission system using the C-band and the L-band can be provided.

Figure 25:
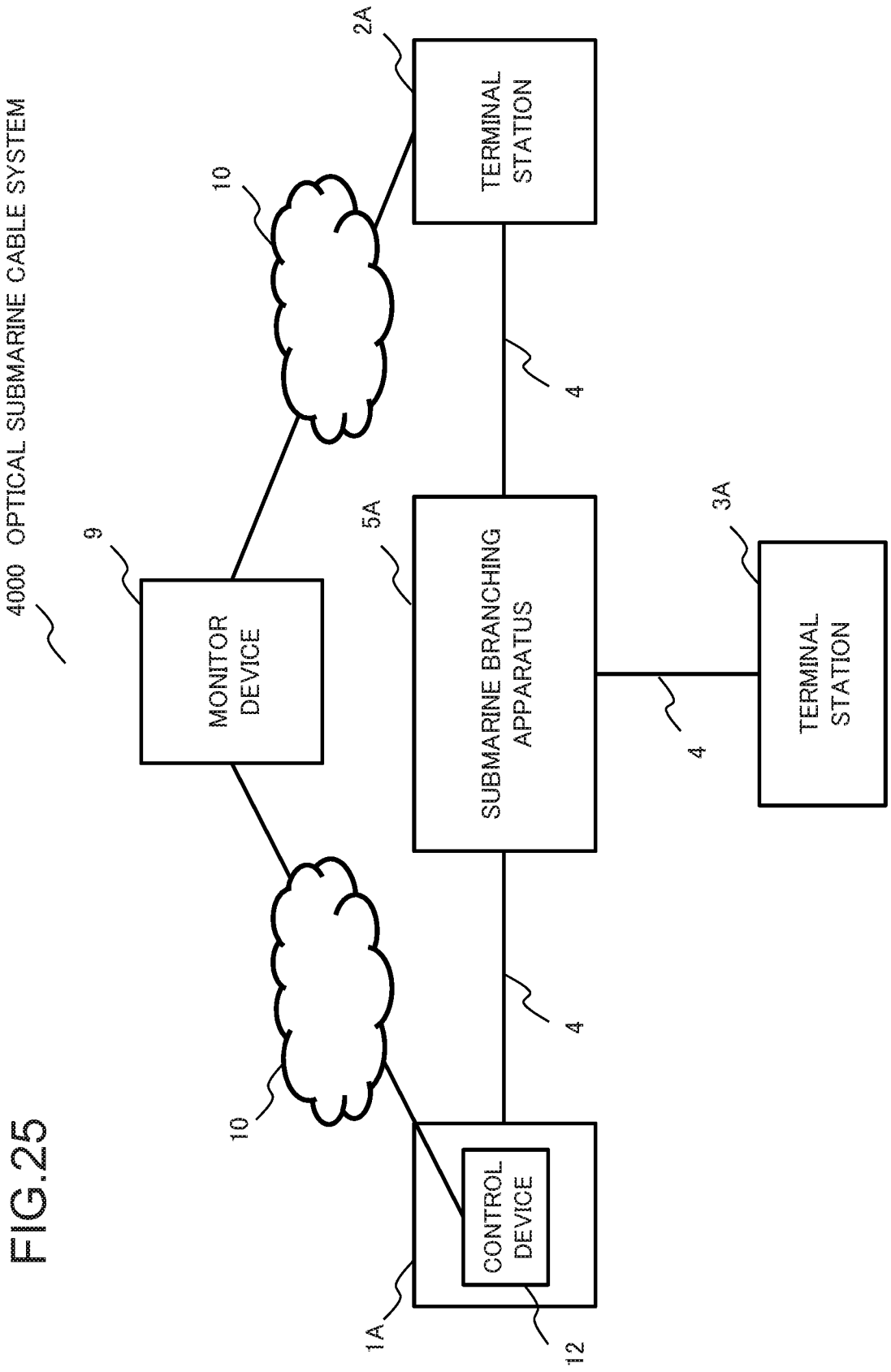
FIG. 25 is a diagram illustrating a configuration example of an optical submarine cable system according to the tenth example embodiment.

Generation of a control signal by the control device may be based on information about a transmission path. At this time, an optical submarine cable system 4000 may include a monitor device 9, as illustrated in FIG. 25. The monitor device 9 monitors path information in the optical submarine cable system 4000 and also manages failure information in each device and on each path. Further, the monitor device 9 exchanges the path information with a control device 12 through a network 10. The network 10 may be an Internet Protocol (IP) network. The example embodiments of the present invention may also be described as the following supplementary notes but are not limited thereto.

(Supplementary Note 1)

A submarine branching apparatus including:

a first demultiplexing unit for demultiplexing a wavelength-multiplexed optical signal input from a first terminal station into a first wavelength-multiplexed optical signal and a second wavelength-multiplexed optical signal;

an optical add/drop unit for outputting at least a third wavelength-multiplexed optical signal included in the first wavelength-multiplexed optical signal to a second terminal station and outputting a fifth wavelength-multiplexed optical signal acquired by multiplexing at least a fourth wavelength-multiplexed optical signal included in the first wavelength-multiplexed optical signal and a wavelength-multiplexed optical signal input from the second terminal station; and a first multiplexing unit for multiplexing the second wavelength-multiplexed optical signal and a fifth wavelength-multiplexed optical signal input from the optical add/drop unit, and outputting the multiplexed signal to a third terminal station.

(Supplementary Note 2)

The submarine branching apparatus according to supplementary note 1, wherein the optical add/drop unit includes:

a first branching unit for splitting a first wavelength-multiplexed optical signal input from the first demultiplexing unit into a first optical branch signal and a second optical branch signal;

a first optical filter for transmitting the fourth wavelength-multiplexed optical signal included in the first optical branch signal; and a second multiplexing unit for outputting the fifth wavelength-multiplexed optical signal acquired by multiplexing a fourth wavelength-multiplexed optical signal input from the first optical filter and a wavelength-multiplexed optical signal input from the second terminal station, and the optical add/drop unit outputs a third wavelength-multiplexed optical signal included in the second optical branch signal to a second terminal station.

(Supplementary Note 3)

The submarine branching apparatus according to supplementary note 2, wherein the optical add/drop unit includes:

a second demultiplexing unit for demultiplexing the second optical branch signal into the third wavelength-multiplexed optical signal and the sixth wavelength-multiplexed optical signal;

a processing unit for performing waveform processing on a sixth wavelength-multiplexed optical signal input from the second demultiplexing unit; and a third multiplexing unit for multiplexing a third wavelength-multiplexed optical signal input from the second demultiplexing unit and a sixth wavelength-multiplexed optical signal having undergone the waveform processing, and outputting the multiplexed signal to the second terminal station.

(Supplementary Note 4)

The submarine branching apparatus according to supplementary note 2, wherein the optical add/drop unit includes:
a second branching unit for splitting a wavelength-multiplexed optical signal input from the second terminal station into a third optical branch signal and a fourth optical branch signal;
a second optical filter for transmitting a dummy signal included in the third optical branch signal; and
a fourth multiplexing unit for multiplexing the fourth optical branch signal and a dummy signal input from the second optical filter, and outputting the multiplexed signal to the second terminal station.

(Supplementary Note 5)

The submarine branching apparatus according to any one of supplementary notes 1 to 4, further including
a failure detection unit for detecting a failure of a transmission line over which a wavelength-multiplexed optical signal is transmitted, wherein,
in response to detection of a failure by the failure detection unit, the optical add/drop unit is capable of changing a wavelength band to be multiplexed and demultiplexed, and outputting the first wavelength-multiplexed optical signal input from the first demultiplexing unit to the first multiplexing unit.

(Supplementary Note 6)

The submarine branching apparatus according to any one of supplementary notes 1 to 4, further including:
a first switching unit;
a second switching unit; and
a failure detection unit for detecting a failure of a transmission line over which a wavelength-multiplexed optical signal is transmitted, wherein,
in response to detection of a failure by the failure detection unit, the first switching unit is capable of switching a signal path from the first demultiplexing unit to the second switching unit and outputting a wavelength-multiplexed optical signal input from the first terminal station to the second switching unit, and
the second switching unit is capable of switching a signal path from the first multiplexing unit to the first switching unit and outputting a wavelength-multiplexed optical signal input from the first switching unit to the third terminal station.

(Supplementary Note 7)

The submarine branching apparatus according to any one of supplementary notes 1 to 6, further including
a control unit for detecting a control signal superposed on a wavelength-multiplexed optical signal input from the first terminal station, wherein
the control unit controls the optical add/drop unit, based on the control signal.

(Supplementary Note 8)

A submarine branching apparatus including:
a first demultiplexing unit for demultiplexing a wavelength-multiplexed optical signal input from a first terminal station into a first wavelength-multiplexed optical signal and a second wavelength-multiplexed optical signal;
a second demultiplexing unit for demultiplexing a wavelength-multiplexed optical signal input from a second terminal station into a third wavelength-multiplexed optical signal and a fourth wavelength-multiplexed optical signal;
a first optical add/drop unit for splitting at least a fifth wavelength-multiplexed optical signal included in the first wavelength-multiplexed optical signal and outputting a seventh wavelength-multiplexed optical signal acquired by multiplexing at least a sixth wavelength-multiplexed optical signal included in the first wavelength-multiplexed optical signal and the third wavelength-multiplexed optical signal;
a second optical add/drop unit for splitting at least an eighth wavelength-multiplexed optical signal included in the second wavelength-multiplexed optical signal and outputting a tenth wavelength-multiplexed optical signal acquired by multiplexing at least a ninth wavelength-multiplexed optical signal included in the second wavelength-multiplexed optical signal and the fourth wavelength-multiplexed optical signal;
a first multiplexing unit for multiplexing the fifth wavelength-multiplexed optical signal and the eighth wavelength-multiplexed optical signal, and outputting the multiplexed signal to a second terminal station; and
a second multiplexing unit for multiplexing the seventh wavelength-multiplexed optical signal and the tenth wavelength-multiplexed optical signal, and outputting the multiplexed signal to a third terminal station.

(Supplementary Note 9)

An optical submarine cable system including:
a first terminal station, a second terminal station, and a third terminal station each of which is capable of outputting a wavelength-multiplexed optical signal; and
a submarine branching apparatus coupled with the first terminal station, the second terminal station, and the third terminal station through an optical submarine cable, wherein
the submarine branching apparatus includes:
a first demultiplexing unit for demultiplexing a wavelength-multiplexed optical signal input from the first terminal station into a first wavelength-multiplexed optical signal and a second wavelength-multiplexed optical signal;
an optical add/drop unit for outputting at least a third wavelength-multiplexed optical signal included in the first wavelength-multiplexed optical signal to the second terminal station and outputting a fifth wavelength-multiplexed optical signal acquired by multiplexing at least a fourth wavelength-multiplexed optical signal included in the first wavelength-multiplexed optical signal and a wavelength-multiplexed optical signal input from the second terminal station; and
a first multiplexing unit for multiplexing the second wavelength-multiplexed optical signal and a fifth wavelength-multiplexed optical signal input from the optical add/drop unit, and outputting the multiplexed signal to the third terminal station.

(Supplementary Note 10)

The optical submarine cable system according to supplementary note 9, wherein
the optical add/drop unit includes:
a first branching unit for splitting a first wavelength-multiplexed optical signal input from the demultiplexing unit into a first optical branch signal and a second optical branch signal;
a first optical filter for transmitting the fourth wavelength-multiplexed optical signal included in the first optical branch signal; and
a second multiplexing unit for outputting the fifth wavelength-multiplexed optical signal acquired by multiplexing a fourth wavelength-multiplexed optical signal input from the first optical filter and a wavelength-multiplexed optical signal input from the second terminal station, and
the optical add/drop unit outputs a third wavelength-multiplexed optical signal included in the second optical branch signal to a second terminal station.

(Supplementary Note 11)

The optical submarine cable system according to supplementary note 10, wherein the optical add/drop unit includes:
a second demultiplexing unit for demultiplexing the second optical branch signal into the third wavelength-multiplexed optical signal and the sixth wavelength-multiplexed optical signal;
a processing unit for performing waveform processing on a sixth wavelength-multiplexed optical signal input from the second demultiplexing unit; and
a third multiplexing unit for multiplexing a third wavelength-multiplexed optical signal input from the second demultiplexing unit and a sixth wavelength-multiplexed optical signal having undergone the waveform processing, and outputting the multiplexed signal to the second terminal station.

(Supplementary Note 12)
The optical submarine cable system according to supplementary note 10, wherein
the optical add/drop unit includes:
a second branching unit for splitting a wavelength-multiplexed optical signal input from the second terminal station into a third optical branch signal and a fourth optical branch signal;
a second optical filter for transmitting a dummy signal included in the third optical branch signal; and
a fourth multiplexing unit for multiplexing the fourth optical branch signal and a dummy signal input from the second optical filter, and outputting the multiplexed signal to the second terminal station.

(Supplementary Note 13)
The optical submarine cable system according to any one of supplementary notes 9 to 12, further including
a failure detection unit for detecting a failure of a transmission line over which a wavelength-multiplexed optical signal is transmitted, wherein,
in response to detection of a failure by the failure detection unit, the optical add/drop unit is capable of changing a wavelength band to be multiplexed and demultiplexed, and outputting the first wavelength-multiplexed optical signal input from the first demultiplexing unit to the first multiplexing unit.

(Supplementary Note 14)
The optical submarine cable system according to any one of supplementary notes 9 to 12, further including:
a first switching unit;
a second switching unit; and
a failure detection unit for detecting a failure of a transmission line over which a wavelength-multiplexed optical signal is transmitted, wherein,
in response to detection of a failure by the failure detection unit, the first switching unit is capable of switching a signal path from the first demultiplexing unit to the second switching unit and outputting a wavelength-multiplexed optical signal input from the first terminal station to the second switching unit, and
the second switching unit is capable of switching a signal path from the first multiplexing unit to the first switching unit and outputting a wavelength-multiplexed optical signal input from the first switching unit to the third terminal station.

(Supplementary Note 15)
The optical submarine cable system according to any one of supplementary notes 9 to 14, further including
a control unit for detecting a control signal superposed on a wavelength-multiplexed optical signal input from the first terminal station, wherein
the control unit controls the optical add/drop unit, based on the control signal.

(Supplementary Note 16)
An optical submarine cable system including:
a first terminal station, a second terminal station, and a third terminal station each of which is capable of outputting a wavelength-multiplexed optical signal; and
a submarine branching apparatus coupled with the first terminal station, the second terminal station, and the third terminal station through an optical submarine cable, wherein
the submarine branching apparatus includes:
a first demultiplexing unit for demultiplexing a wavelength-multiplexed optical signal input from a first terminal station into a first wavelength-multiplexed optical signal and a second wavelength-multiplexed optical signal;
a second demultiplexing unit for demultiplexing a wavelength-multiplexed optical signal input from a second terminal station into a third wavelength-multiplexed optical signal and a fourth wavelength-multiplexed optical signal;
a first optical add/drop unit for splitting at least a fifth wavelength-multiplexed optical signal included in the first wavelength-multiplexed optical signal and outputting a seventh wavelength-multiplexed optical signal acquired by multiplexing at least a sixth wavelength-multiplexed optical signal included in the first wavelength-multiplexed optical signal and the third wavelength-multiplexed optical signal;
a second optical add/drop unit for splitting at least an eighth wavelength-multiplexed optical signal included in the second wavelength-multiplexed optical signal and outputting a tenth wavelength-multiplexed optical signal acquired by multiplexing at least a ninth wavelength-multiplexed optical signal included in the second wavelength-multiplexed optical signal and the fourth wavelength-multiplexed optical signal;
a first multiplexing unit for multiplexing the fifth wavelength-multiplexed optical signal and the eighth wavelength-multiplexed optical signal, and outputting the multiplexed signal to a second terminal station; and
a second multiplexing unit for multiplexing the seventh wavelength-multiplexed optical signal and the tenth wavelength-multiplexed optical signal, and outputting the multiplexed signal to a third terminal station.

(Supplementary Note 17)
An optical communication method including:
demultiplexing a wavelength-multiplexed optical signal input from a first terminal station into a first wavelength-multiplexed optical signal and a second wavelength-multiplexed optical signal;
outputting at least a third wavelength-multiplexed optical signal included in the first wavelength-multiplexed optical signal to a second terminal station and outputting a fifth wavelength-multiplexed optical signal acquired by multiplexing at least a fourth wavelength-multiplexed optical signal included in the first wavelength-multiplexed optical signal and a wavelength-multiplexed optical signal input from a second terminal station; and
multiplexing the second wavelength-multiplexed optical signal and the fifth wavelength-multiplexed optical signal, and outputting the multiplexed signal to a third terminal station.

(Supplementary Note 18)
The optical communication method according to supplementary note 17, further including:
splitting the demultiplexed first wavelength-multiplexed optical signal into a first optical branch signal and a second optical branch signal;

transmitting the fourth wavelength-multiplexed optical signal included in the first optical branch signal;

outputting the fifth wavelength-multiplexed optical signal acquired by multiplexing the transmitted fourth wavelength-multiplexed optical signal and a wavelength-multiplexed optical signal input from the second terminal station; and outputting a third wavelength-multiplexed optical signal included in the second optical branch signal to a second terminal station.

(Supplementary Note 19)

The optical communication method according to supplementary note 18, further including:

demultiplexing the second optical branch signal into the third wavelength-multiplexed optical signal and the sixth wavelength-multiplexed optical signal;

performing waveform processing on a sixth wavelength-multiplexed optical signal input from the second demultiplexing unit; and multiplexing a third wavelength-multiplexed optical signal input from the second demultiplexing unit and a sixth wavelength-multiplexed optical signal having undergone the waveform processing, and outputting the multiplexed signal to the second terminal station.

(Supplementary Note 20)

The optical communication method according to supplementary note 18, further including:

splitting a wavelength-multiplexed optical signal input from the second terminal station into a third optical branch signal and a fourth optical branch signal;

transmitting a dummy signal included in the third optical branch signal; and multiplexing the fourth optical branch signal and the transmitted dummy signal, and outputting the multiplexed signal to the second terminal station.

(Supplementary Note 21)

The optical communication method according to any one of supplementary notes 17 to 20, further including:

detecting a failure of a transmission line over which a wavelength-multiplexed optical signal is transmitted; and, in response to detection of a failure, changing a wavelength band to be multiplexed and demultiplexed, and outputting the first wavelength-multiplexed optical signal to the second terminal station.

(Supplementary Note 22)

The optical communication method according to any one of supplementary notes 17 to 20, further including:

detecting a failure of a transmission line over which a wavelength-multiplexed optical signal is transmitted; and, in response to detection of a failure, switching a signal path and outputting a wavelength-multiplexed optical signal input from the first terminal station to the second terminal station.

(Supplementary Note 23)

The optical communication method according to any one of supplementary notes 17 to 22, further including:

detecting a control signal superposed on a wavelength-multiplexed optical signal input from the first terminal station; and controlling a wavelength band to be multiplexed and demultiplexed, based on the control signal.

(Supplementary Note 24)

An optical communication method including:

demultiplexing a wavelength-multiplexed optical signal input from a first terminal station into a first wavelength-multiplexed optical signal and a second wavelength-multiplexed optical signal;

demultiplexing a wavelength-multiplexed optical signal input from a second terminal station into a third wavelength-multiplexed optical signal and a fourth wavelength-multiplexed optical signal;

splitting at least a fifth wavelength-multiplexed optical signal included in the first wavelength-multiplexed optical signal and outputting a seventh wavelength-multiplexed optical signal acquired by multiplexing at least a sixth wavelength-multiplexed optical signal included in the first wavelength-multiplexed optical signal and the third wavelength-multiplexed optical signal;

splitting at least an eighth wavelength-multiplexed optical signal included in the second wavelength-multiplexed optical signal and outputting a tenth wavelength-multiplexed optical signal acquired by multiplexing at least a ninth wavelength-multiplexed optical signal included in the second wavelength-multiplexed optical signal and the fourth wavelength-multiplexed optical signal;

multiplexing the fifth wavelength-multiplexed optical signal and the eighth wavelength-multiplexed optical signal, and outputting the multiplexed signal to a second terminal station; and multiplexing the seventh wavelength-multiplexed optical signal and the tenth wavelength-multiplexed optical signal, and outputting the multiplexed signal to a third terminal station.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-188684 filed on Sep. 28, 2017, the disclosure of which is incorporated herein in its entirety by reference.

REFERENCE SIGNS LIST 1, 1A, 2, 2A, 3, 3A Terminal station
4 Optical submarine cable
5, 5A, 6, 7A, 7B, 8A, 8B Submarine branching apparatus
9 Monitor device
10 Network
11 Transmission device
12 Control device
13, 53, 65, 66, 73, 76, 83, 88, 523, 526, 531 Multiplexing unit
14, 521, 527 Branching Unit
15 Reception unit
16 Control unit
17 Optical component
51, 61, 62, 71, 74, 81, 86, 524 Demultiplexing unit
52, 52A, 52B, 52C, 72, 82 Optical add/drop unit
63 C-band optical add/drop unit
64 L-band optical add/drop unit
70, 80 Failure detection unit
75, 87, 525 Processing unit
84, 85 Switching unit
101, 102, 103, 104, 105, 106, 107, 108, 109, 201, 202, 203, 204, 303 WDM signal
110, 130, 140, 210, 230 C-band signal
111, 112, 113, 211, 212, 213, 221, 222, 223 Band signal
114, 117, 118 Processed signal
115 Dummy signal
120, 220, 240 L-band signal
151 Optical filter 152, 153 Photoelectric conversion unit
154 LPF
301 Main signal
302 Control signal
522, 528, 529, 530 Wavelength selection unit
1000, 2000, 3000, 4000 Optical submarine cable system

The invention claimed is:

1. A submarine branching apparatus comprising:
a first demultiplexer configured to demultiplex a first wavelength-multiplexed optical input signal from a first terminal station, that includes a first wavelength band including a C-band and a second wavelength band including an L-band, into a first wavelength-multiplexed optical signal in the first wavelength band and a second wavelength-multiplexed optical signal in the second wavelength band;
a first optical add/drop circuit configured to output at least a third wavelength-multiplexed optical signal included in the first wavelength-multiplexed optical signal to a second terminal station and output a fifth wavelength-multiplexed optical signal in the first wavelength band acquired by multiplexing at least a fourth wavelength-multiplexed optical signal included in the first wavelength-multiplexed optical signal and a second wavelength-multiplexed optical input signal from the second terminal station;
a second optical add/drop circuit configured to output at least a sixth wavelength-multiplexed optical signal included in the second wavelength-multiplexed optical signal to the second terminal station and output an eighth wavelength-multiplexed optical signal in the second wavelength band acquired by multiplexing at least a seventh wavelength-multiplexed optical signal included in the second wavelength-multiplexed optical signal and a third wavelength-multiplexed optical input signal from the second terminal station; and
a first multiplexer configured to multiplex the fifth wavelength-multiplexed optical signal input from the first optical add/drop circuit and the eighth wavelength-multiplexed optical signal input from the second optical add/drop circuit, and output the multiplexed signal to a third terminal station.

2. The submarine branching apparatus according to claim 1, wherein the first optical add/drop circuit includes:
a first branching circuit configured to split the first wavelength-multiplexed optical signal input from the first into a first optical branch signal and a second optical branch signal;
a first optical filter configured to transmit the fourth wavelength-multiplexed optical signal included in the first optical branch signal; and
a second multiplexing circuit configured to output the fifth wavelength-multiplexed optical signal acquired by multiplexing the fourth wavelength-multiplexed optical signal input from the first optical filter and the second wavelength-multiplexed optical input signal from the second terminal station, and
the first optical add/drop circuit outputs the third wavelength-multiplexed optical signal included in the second optical branch signal to the second terminal station.

3. The submarine branching apparatus according to claim 2, wherein the first optical add/drop circuit includes:
a second demultiplexer configured to demultiplex the second optical branch signal into the third wavelength-multiplexed optical signal and a sixth wavelength-multiplexed optical signal;
a processor configured to perform waveform processing on the sixth wavelength-multiplexed optical signal input from the second demultiplexer; and
a third multiplexer configured to multiplex the third wavelength-multiplexed optical signal input from the second demultiplexer and the sixth wavelength-multiplexed optical signal having undergone the waveform processing, and output the multiplexed signal to the second terminal station.

4. The submarine branching apparatus according to claim 2, wherein the first optical add/drop circuit includes:
a second branching circuit configured to split the second wavelength-multiplexed optical input signal from the second terminal station into a third optical branch signal and a fourth optical branch signal;
a second optical filter configured to transmit a dummy signal included in the third optical branch signal; and
a fourth multiplexer configured to multiplex the third wavelength-multiplexed optical signal and a dummy signal input from the second optical filter, and output the multiplexed signal to the second terminal station.

5. The submarine branching apparatus according to claim 1, further comprising
a failure detector configured to detect a failure of a transmission line over which at least one of the first, second, third, fourth, and fifth wavelength-multiplexed optical signals are transmitted, wherein,
in response to detection of a failure by the failure detector, the first optical add/drop circuit is capable of changing a wavelength band to be multiplexed and demultiplexed, and outputting the first wavelength-multiplexed optical signal input from the first demultiplexer to the first multiplexer.

6. The submarine branching apparatus according to claim 1, further comprising:
a first switch;
a second switch; and
a failure detector configured to detect a failure of a transmission line over which the first wavelength-multiplexed optical input signal is transmitted, wherein,
in response to detection of a failure by the failure detector, the first switch is capable of switching a signal path from the first demultiplexer to the second switch and outputting the first wavelength-multiplexed optical input signal from the first terminal station to the second switch, and
the second switch is capable of switching a signal path from the first multiplexer to the first switch and outputting the first wavelength-multiplexed optical input signal from the first switch to the third terminal station.

7. The submarine branching apparatus according to claim 1, further comprising
a controller configured to detect a control signal superposed on the first wavelength-multiplexed optical input signal from the first terminal station, wherein
the controller controls the first optical add/drop circuit, based on the control signal.

8. The submarine branching apparatus according to claim 1, further comprising:
a second demultiplexer configured to demultiplex a wavelength-multiplexed optical signal from the second terminal station into the second wavelength-multiplexed optical input signal and the third wavelength-multiplexed optical input signal; and
a second multiplexer configured to multiplex the third wavelength-multiplexed optical signal and the sixth wavelength-multiplexed optical signal input, and output the multiplexed signal to the second terminal station.

9. An optical submarine cable system comprising:
a first terminal station, a second terminal station, and a third terminal station each of which is capable of outputting a wavelength-multiplexed optical signal; and
a submarine branching apparatus coupled with the first terminal station, the second terminal station, and the third terminal station through an optical submarine cable, wherein the submarine branching apparatus includes:
a first demultiplexer configured to demultiplex a first wavelength-multiplexed optical input signal from the first terminal station, that includes a first wavelength band including a C- band and a second wavelength band including an L-band into a first wavelength-multiplexed optical signal in the first wavelength band and a second wavelength-multiplexed optical signal in the second wavelength band;
a first optical add/drop circuit configured to output at least a third wavelength-multiplexed optical signal included in the first wavelength-multiplexed optical signal input from the first demultiplexer to the second terminal station and output a fifth wavelength-multiplexed optical signal in the first wavelength band acquired by multiplexing at least a fourth wavelength- multiplexed optical signal included in the first wavelength-multiplexed optical signal input from the first demultiplexer and a second wavelength-multiplexed optical input signal from the second terminal station;
a second optical add/drop circuit configured to output at least a sixth wavelength-multiplexed optical signal included in the second wavelength-multiplexed optical signal to the second terminal station and output an eighth wavelength-multiplexed optical signal in the second wavelength band acquired by multiplexing at least a seventh wavelength-multiplexed optical signal included in the second wavelength-multiplexed optical signal and a third wavelength-multiplexed optical input signal from the second terminal station; and a first multiplexer configured to multiplex the fifth wavelength-multiplexed optical signal input from the first optical add/drop circuit and the eighth wavelength-multiplexed optical signal input from the second optical add/drop circuit, and output the multiplexed signal to the third terminal station.

10. The optical submarine cable system according to claim 9, wherein the first optical add/drop circuit includes:
a first branching circuit configured to split the first wavelength-multiplexed optical signal input from the first demultiplexer into a first optical branch signal and a second optical branch signal;
a first optical filter configured to transmit the fourth wavelength-multiplexed optical signal included in the first optical branch signal; and
a second multiplexing circuit configured to output the fifth wavelength-multiplexed optical signal acquired by multiplexing the fourth wavelength-multiplexed optical signal input from the first optical filter and the second wavelength-multiplexed optical input signal from the second terminal station, and
the first optical add/drop circuit outputs the third wavelength-multiplexed optical signal included in the second optical branch signal to a second terminal station.

11. The optical submarine cable system according to claim 10, wherein the first optical add/drop circuit includes:
a second demultiplexer configured to demultiplex the second optical branch signal into the third wavelength-multiplexed optical signal and a sixth wavelength-multiplexed optical signal;
a processor configured to perform waveform processing on the sixth wavelength-multiplexed optical signal input from the second demultiplexer; and
a third multiplexer configured to multiplex the third wavelength-multiplexed optical signal input from the second demultiplexer and the sixth wavelength-multiplexed optical signal having undergone the waveform processing, and output the multiplexed signal to the second terminal station.

12. The optical submarine cable system according to claim 10, wherein the first optical add/drop circuit includes:
a second branching circuit configured to split the second wavelength-multiplexed optical input signal from the second terminal station into a third optical branch signal and a fourth optical branch signal;
a second optical filter configured to transmit a dummy signal included in the third optical branch signal; and
a fourth multiplexer configured to multiplex the third wavelength-multiplexed optical signal and a dummy signal input from the second optical filter, and output the multiplexed signal to the second terminal station.

13. The optical submarine cable system according to claim 9, further comprising
a failure detector configured to detect a failure of a transmission line over which at least one of the first, second, third, fourth, and fifth wavelength-multiplexed optical signals are transmitted, wherein,
in response to detection of a failure by the failure detector, the first optical add/drop circuit is capable of changing a wavelength band to be multiplexed and demultiplexed, and outputting the first wavelength-multiplexed optical signal input from the first demultiplexer to the first multiplexer.

14. The optical submarine cable system according to claim 9, further comprising:
a first switch;
a second switch; and
a failure detector configured to detect a failure of a transmission line over which the first wavelength-multiplexed optical input signal is transmitted, wherein,
in response to detection of a failure by the failure detector, the first switch is capable of switching a signal path from the first demultiplexer to the second switch and outputting the first wavelength-multiplexed optical input signal from the first terminal station to the second switch, and
the second switch is capable of switching a signal path from the first multiplexer to the first switch and outputting the first wavelength-multiplexed optical input signal from the first switch to the third terminal station.

15. The optical submarine cable system according to claim 9, further comprising
a controller configured to detect a control signal superposed on the first wavelength-multiplexed optical input signal from the first terminal station, wherein
the controller controls the first optical add/drop circuit, based on the control signal.

16. An optical communication method comprising:
demultiplexing a first wavelength-multiplexed optical input signal from a first terminal station, that includes a first wavelength band including a C-band and a second wavelength band including an L-band, into a first wavelength-multiplexed optical signal in the first wavelength band and a second wavelength-multiplexed optical signal in the second wavelength band;

outputting at least a third wavelength-multiplexed optical signal included in the first wavelength-multiplexed optical signal to a second terminal station and outputting a fifth wavelength-multiplexed optical signal in the first wavelength band acquired by multiplexing at least a fourth wavelength-multiplexed optical signal included in the first wavelength-multiplexed optical signal and a second wavelength-multiplexed optical input signal from a second terminal station;

outputting at least a sixth wavelength-multiplexed optical signal included in the second wavelength-multiplexed optical signal to the second terminal station and output an eighth wavelength- multiplexed optical signal in the second wavelength band acquired by multiplexing at least a seventh wavelength-multiplexed optical signal included in the second wavelength-multiplexed optical signal and a third wavelength-multiplexed optical input signal from the second terminal station; and multiplexing the fifth wavelength- multiplexed optical signal and the eighth wavelength-multiplexed optical signal, and outputting the multiplexed signal to a third terminal station.

17. The optical communication method according to claim 16, further comprising:
splitting the demultiplexed first wavelength-multiplexed optical signal into a first optical branch signal and a second optical branch signal;
transmitting the fourth wavelength-multiplexed optical signal included in the first optical branch signal;
outputting the fifth wavelength-multiplexed optical signal acquired by multiplexing the transmitted fourth wavelength-multiplexed optical signal and the second wavelength-multiplexed optical input signal from the second terminal station; and
outputting the third wavelength-multiplexed optical signal included in the second optical branch signal to the second terminal station.

18. The optical communication method according to claim 17, further comprising:
demultiplexing the second optical branch signal into the third wavelength-multiplexed optical signal and a sixth wavelength-multiplexed optical signal;
performing waveform processing on the demultiplexed sixth wavelength-multiplexed optical signal; and
multiplexing the demultiplexed third wavelength-multiplexed optical signal and the sixth wavelength-multiplexed optical signal having undergone the waveform processing, and outputting the multiplexed signal to the second terminal station.

19. The optical communication method according to claim 17, further comprising:
splitting the second wavelength-multiplexed optical input signal from the second terminal station into a third optical branch signal and a fourth optical branch signal;
transmitting a dummy signal included in the third optical branch signal; and
multiplexing the third wavelength-multiplexed optical signal and the transmitted dummy signal, and outputting the multiplexed signal to the second terminal station.

20. The optical communication method according to claim 16, further comprising:
detecting a failure of a transmission line over which at least one of the first, second, third, fourth, and fifth wavelength-multiplexed optical signals are transmitted; and,
in response to detection of a failure, changing a wavelength band to be multiplexed and demultiplexed, and outputting the first wavelength-multiplexed optical signal to the second terminal station.

21. The optical communication method according to claim 16, further comprising:
detecting a failure of a transmission line over which at least one of the first, second, third, fourth, and fifth wavelength-multiplexed optical signals are transmitted; and,
in response to detection of a failure, switching a signal path and outputting the first wavelength-multiplexed optical input signal from the first terminal station to the second terminal station.

* * * * *